(12) United States Patent
Xiong et al.

(10) Patent No.: US 11,190,382 B2
(45) Date of Patent: Nov. 30, 2021

(54) RS (REFERENCE SIGNAL) SEQUENCE GENERATION AND MAPPING AND PRECODER ASSIGNMENT FOR NR (NEW RADIO)

(71) Applicant: Apple Inc., Cupertino, CA (US)

(72) Inventors: Gang Xiong, Portland, OR (US); Debdeep Chatterjee, San Jose, CA (US); Yushu Zhang, Beijing (CN); Alexei Davydov, Nizhny Novgorod (RU); Wook Bong Lee, San Jose, CA (US); Dae Won Lee, Portland, OR (US); Sameer Pawar, Santa Clara, CA (US); Jeongho Jeon, San Jose, CA (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/500,971

(22) PCT Filed: May 3, 2018

(86) PCT No.: PCT/US2018/030873
§ 371 (c)(1),
(2) Date: Oct. 4, 2019

(87) PCT Pub. No.: WO2018/204630
PCT Pub. Date: Nov. 8, 2018

(65) Prior Publication Data
US 2020/0052939 A1 Feb. 13, 2020

Related U.S. Application Data

(60) Provisional application No. 62/502,372, filed on May 5, 2017, provisional application No. 62/520,874, filed
(Continued)

(51) Int. Cl.
*H04L 27/26* (2006.01)
*H04L 5/00* (2006.01)

(52) U.S. Cl.
CPC .......... *H04L 27/261* (2013.01); *H04L 5/001* (2013.01); *H04L 5/0017* (2013.01); *H04L 5/0051* (2013.01)

(58) Field of Classification Search
CPC ..... H04L 27/261; H04L 5/001; H04L 5/0017; H04L 5/0051; H04L 27/2613; H04L 5/0026; H04L 5/0048
See application file for complete search history.

(56) References Cited

U.S. PATENT DOCUMENTS 8,705,457 B2 * 4/2014 Kwak ............... H04L 5/003
370/329
2008/0013516 A1 * 1/2008 Zhang ............... H04J 11/00
370/342

(Continued)

FOREIGN PATENT DOCUMENTS

CN 102036250 A * 4/2011
EP 2448139 A2 5/2012
EP 3457782 A1 * 3/2019 ............. H04L 5/003

OTHER PUBLICATIONS

International Search Report dated Oct. 5, 2018 for International Application No. PCT/US2018/030873.
(Continued)

*Primary Examiner* — Harry H Kim
(74) *Attorney, Agent, or Firm* — Eschweiler & Potashnik, LLC

(57) ABSTRACT

Techniques discussed herein can facilitate RS (Reference Signal) sequence generation and mapping, and/or precoder assignment, for NR (New Radio). One example embodiment employable at a NR wireless communication device comprises processing circuitry configured to: generate one or
(Continued)

more PN (Pseudo Noise) sequences based at least in part on an initial state of a PN generator; extract, for each PRB (Physical Resource Block) of one or more PRBs, an associated portion of an associated PN sequence of the one or more PN sequences, based at least in part on a reference subcarrier index, independent of a bandwidth part configuration and of a maximum supported number of PRBs; and generate, for each PRB of the one or more PRBs, an associated set of RS(s) for that PRB based at least in part on the extracted associated portion of the associated PN sequence for that PRB.

22 Claims, 17 Drawing Sheets

Related U.S. Application Data on Jun. 16, 2017, provisional application No. 62/532,837, filed on Jul. 14, 2017.

(56) References Cited

U.S. PATENT DOCUMENTS

| | | |
|---|---|---|
| 2011/0237267 A1 | 9/2011 | Chen et al. |
| 2011/0249767 A1 | 10/2011 | Chen et al. |
| 2012/0250663 A1 | 10/2012 | Han et al. |
| 2012/0275413 A1* | 11/2012 | Hong ............ H04L 5/0041 370/329 |
| 2012/0320843 A1 | 12/2012 | Kim et al. |
| 2013/0242886 A1* | 9/2013 | Chen ............ H04L 65/601 370/329 |
| 2015/0036609 A1* | 2/2015 | Kim ............ H04L 5/0048 370/329 |
| 2016/0057716 A1* | 2/2016 | Kim ............ H04L 5/0007 370/350 |
| 2018/0048444 A1* | 2/2018 | Park ............ H04L 5/0048 |
| 2018/0359014 A1* | 12/2018 | Noh ............ H04B 7/0417 |
| 2019/0190572 A1* | 6/2019 | Osawa ............ H04B 7/0413 |
| 2019/0387377 A1* | 12/2019 | Zhang ............ H04W 52/281 |
| 2020/0067676 A1* | 2/2020 | Yi ............ H04L 1/0013 |
| 2020/0076484 A1* | 3/2020 | Noh ............ H04L 5/001 |
| 2020/0137747 A1* | 4/2020 | Xu ............ H04L 5/0053 |

OTHER PUBLICATIONS

"LTE; Evolved Universal Terrestrial Radio Access (E-UTRA); Physical channels and modulation (3GPP TS 36.211 version 10.0.0 Release 10)." ETSI TS 136 211 V10.0.0 (Jan. 2011). Lte Advanced.
"LTE; Evolved Universal Terrestrial Radio Access (E-UTRA); Physical layer procedures (3GPP TS 36.213 version 13.0.0 Release 13)." ETSI TS 136 213 V13.0.0 (May 2016). Lte Advanced.
International Preliminary Report on Patentability dated Nov. 5, 2019 for International Application No. PCT/US2018/030873.

\* cited by examiner

RS (REFERENCE SIGNAL) SEQUENCE
GENERATION AND MAPPING AND
PRECODER ASSIGNMENT FOR NR (NEW
RADIO)

REFERENCE TO RELATED APPLICATIONS

This application is a National Phase entry application of International Patent Application No. PCT/US2018/030873 filed May 3, 2018, which claims priority to U.S. Provisional Applications No. 62/502,372 filed May 5, 2017, entitled "SYSTEM AND METHODS FOR DEMODULATION REFERENCE SIGNAL SEQUENCE GENERATION AND MAPPING FOR 5G NEW RADIO", 62/520,874 filed Jun. 16, 2017, entitled "SEQUENCE GENERATION FOR REFERENCE SIGNALS IN NEW RADIO (NR)", and 62/532, 837 filed Jul. 14, 2017, entitled "PRECODER ASSIGNMENT FOR NEW RADIO COMMUNICATION SYSTEMS", and is hereby incorporated by reference in its entirety.

FIELD

The present disclosure relates to wireless technology, and more specifically to techniques for generation and mapping of RS (Reference Signal) sequences and/or precoder assignment.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Figure 1:
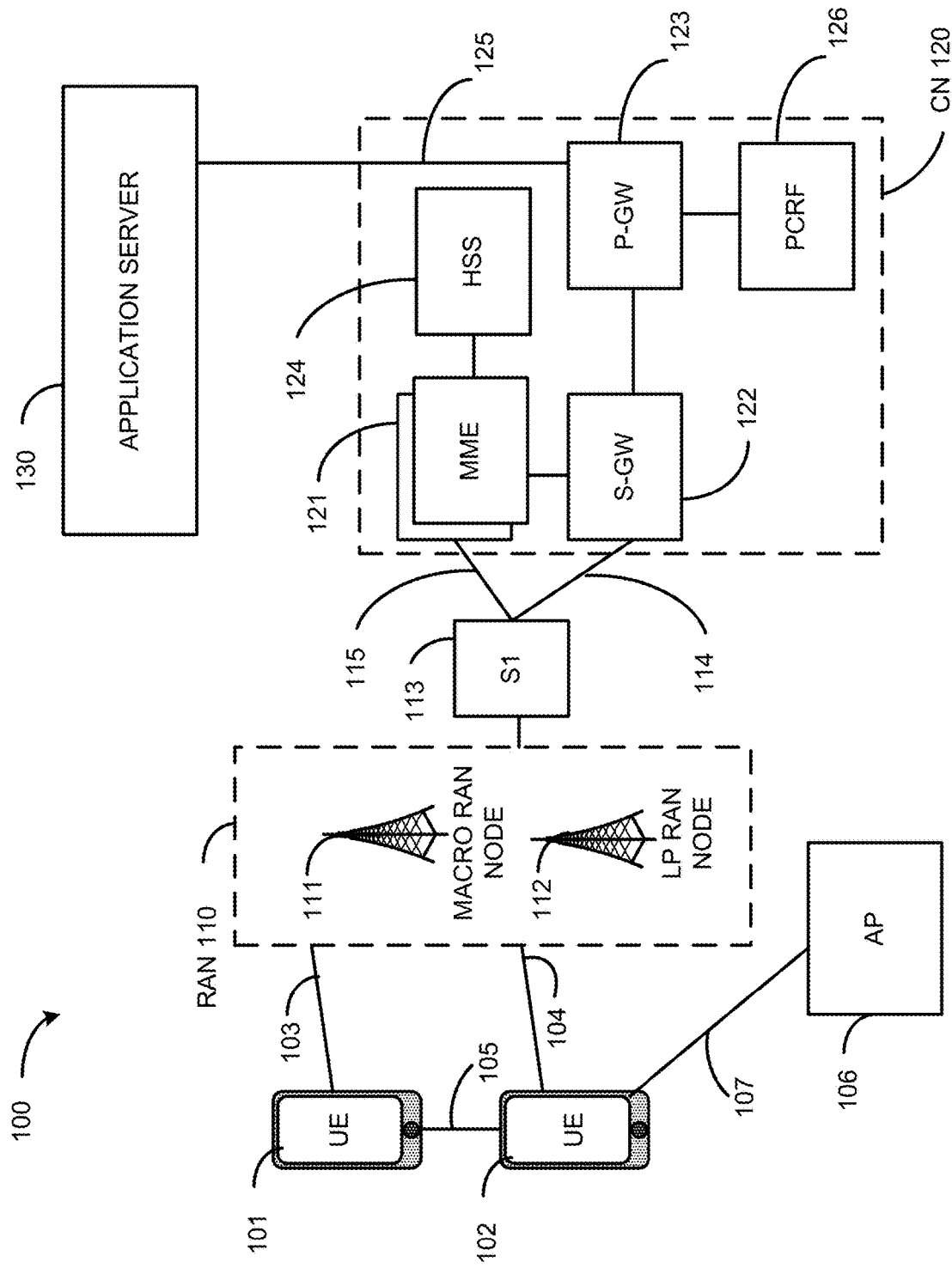
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDCCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
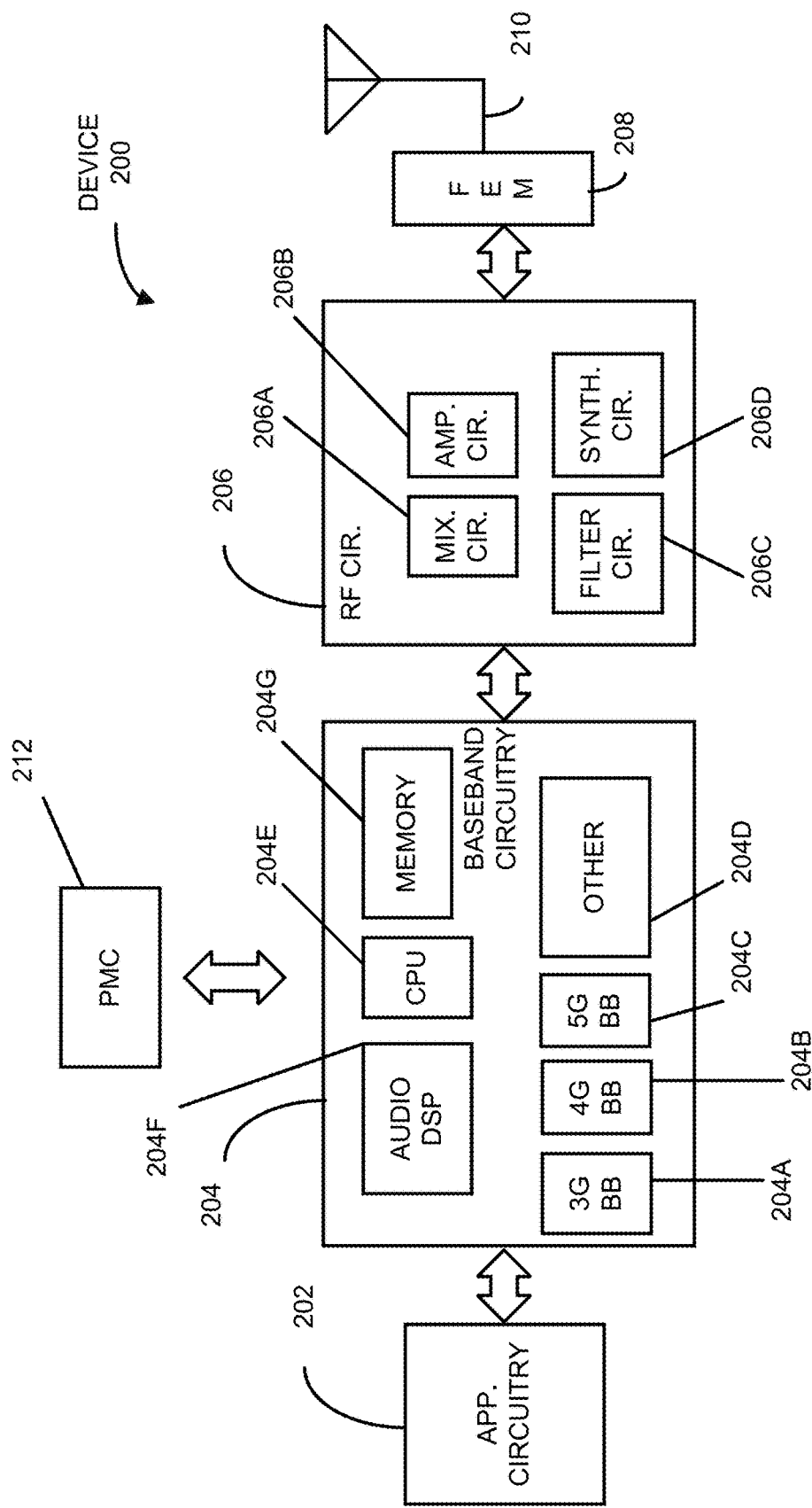
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
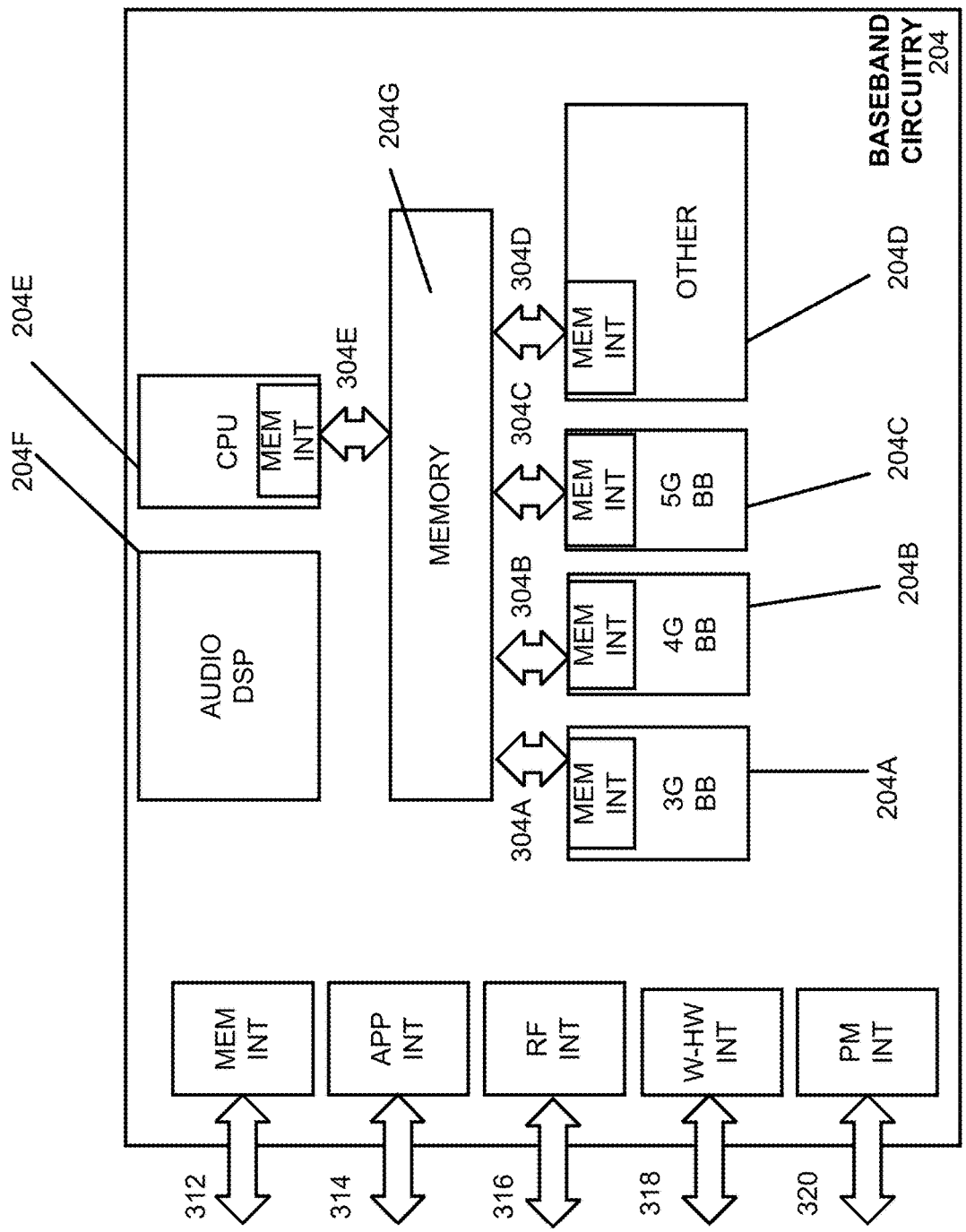
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
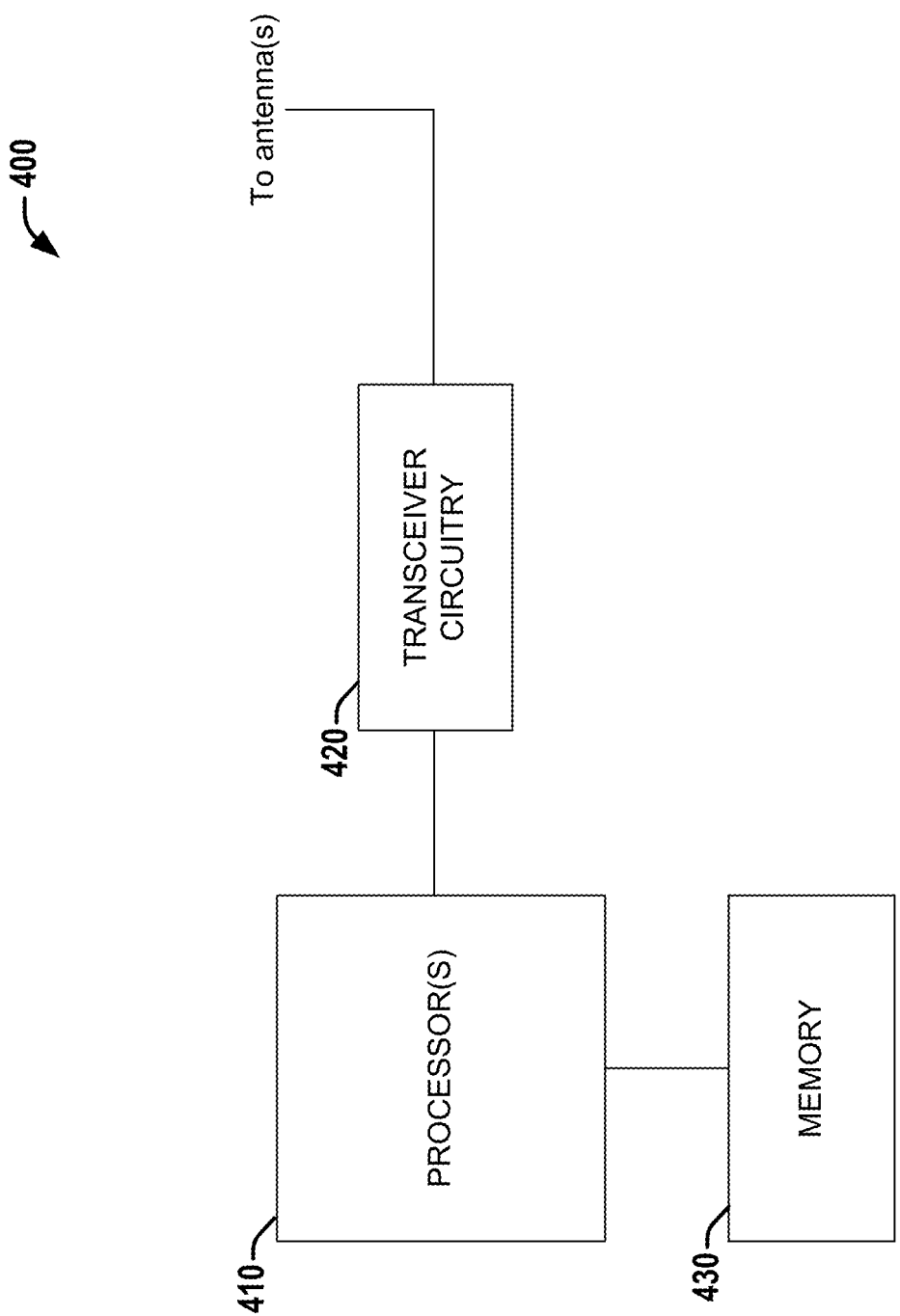
FIG. 4 is a block diagram illustrating a system employable at a UE (User Equipment) that facilitates RS (Reference Signal) sequence generation and mapping and/or precoder assignment for NR (New Radio), according to various aspects described herein.

Referring to FIG. 4, illustrated is a block diagram of a system 400 employable at a UE (User Equipment) that facilitates RS (Reference Signal) sequence generation and mapping and/or precoder assignment for NR (New Radio), according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate one or more aspects discussed below in connection with precoder assignment and/or RS sequence generation and mapping for NR.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
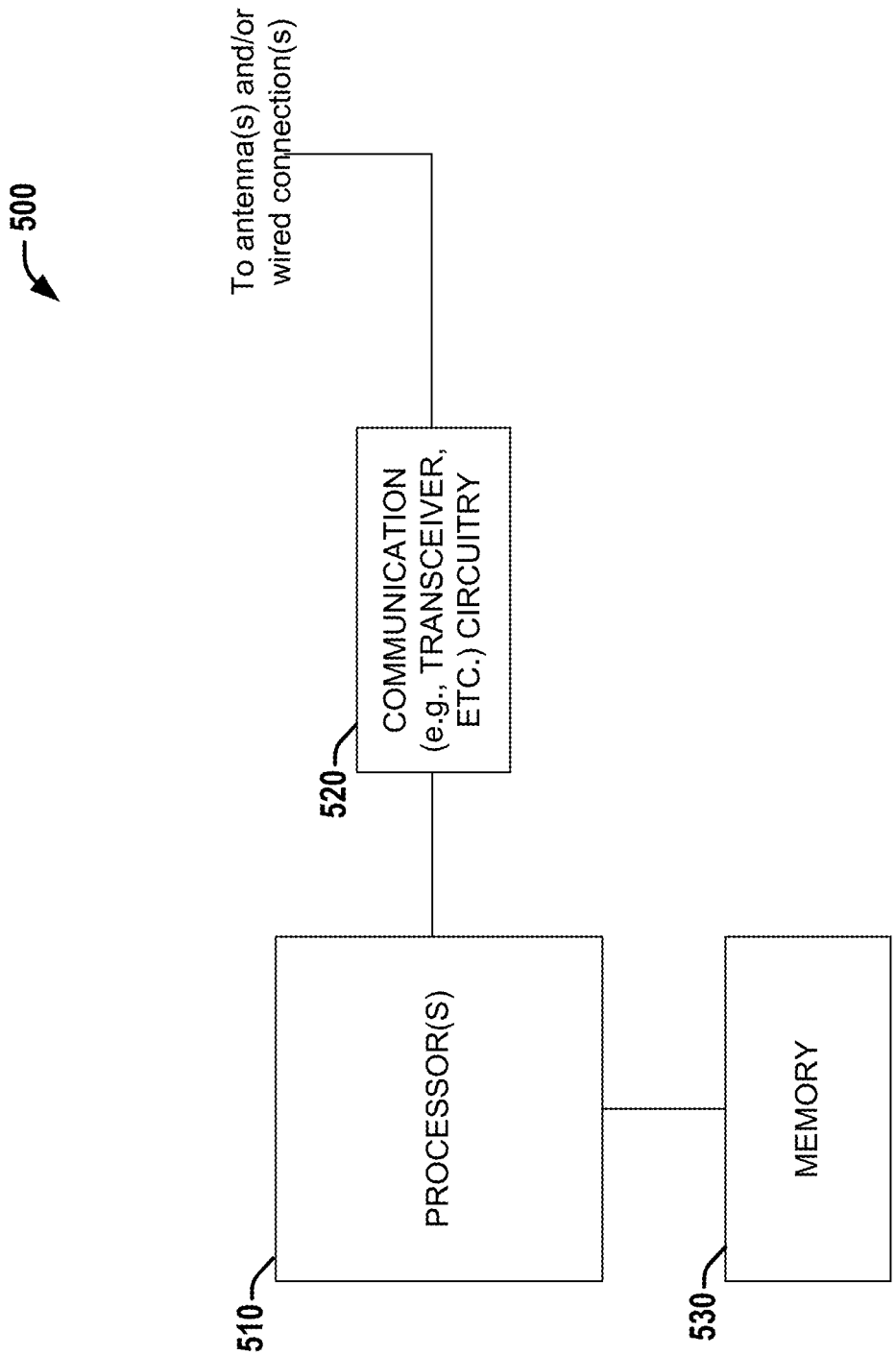
FIG. 5 is a block diagram illustrating a system employable at a BS (Base Station) that facilitates RS (Reference Signal) sequence generation and mapping and/or precoder assignment for NR (New Radio), according to various aspects described herein.

Referring to FIG. 5, illustrated is a block diagram of a system 500 employable at a BS (Base Station) that facilitates RS (Reference Signal) sequence generation and mapping and/or precoder assignment for NR (New Radio), according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate one or more aspects discussed below in connection with precoder assignment and/or RS sequence generation and mapping for NR.

Sequence Generation for Reference Signals in New Radio (NR)

LTE (Long Term Evolution) supports multiple reference signals in DL (Downlink), which are QPSK (Quadrature Phase Shift Keying) modulated using pseudo random Gold sequence c(n), which is obtained by combining the two M-sequences $x_1$ and $x_2$ of length 31 as described in 3GPP (Third Generation Partnership Project) TS (Technical Specification) 36.211. The output sequence c(n) of length $M_{PN}$, where n=0, 1, . . . , $M_{PN}$-1, is defined by equations (1)-(3):

$$c(n)=(x_1(n+N_c)+x_2(n+N_c)) \bmod 2 \quad (1)$$

$$x_1(n+31)=(x_1(n+3)+x_1(n)) \bmod 2 \quad (2)$$

$$x_2(n+31)=(x_2(n+3)+x_2(n+2)+x_2(n+1)+x_2(n)) \bmod 2 \quad (3),$$

where $N_c$=1600 and the first m-sequence can be initialized with $x_1(0)$=1, $x_1(n)$=0, n=1, 2, . . . , 30. The initialization of the second m-sequence is denoted by $c_{init}=\Sigma_{i=0}^{30} x_2(i) \cdot 2^i$, with the value depending on the application of the sequence.

For UE-specific reference signals (e.g., demodulation reference signal (DM-RS)) with antenna ports p=7, p=8 or p=7, 8, . . . , v+6 another procedure is used. In particular, for a given physical resource block (PRB) with frequency-domain index $n_{PRB}$ assigned for the corresponding PDSCH (Physical Downlink Shared Channel) transmission, a part of the reference signal sequence r(m) is mapped (e.g., via processor(s) 510 and transceiver circuitry 520) to complex-valued modulation symbols $a_{k,l}^{(p)}$ in a subframe according to the following rule (for normal CP (Cyclic Prefix)) in equation (4):

$$a_{k,l}^{(p)} = w_p(l') \cdot r(3 \cdot l' \cdot N_{RB}^{max,DL} + 3 \cdot n_{PRB} + m') \quad (4)$$

where $$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, 8 or 9 (see Table 4.2-1)} \\ l' \bmod 2 + 2 + 3\lfloor l'/2 \rfloor & \text{if in a special subframe with configuration 1, 2, 6, or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 4.2-1)} \\ 0, 1 & \text{if } n_s \bmod 2 = 0 \text{ and not in special subframe with configuration 1, 2, 6, or 7 (see Table 4.2-1)} \\ 2, 3 & \text{if } n_s \bmod 2 = 1 \text{ and not in special subframe with configuration 1, 2, 6, or 7 (see Table 4.2-1)} \end{cases}$$

$$m' = 0, 1, 2,$$

and the sequence $\bar{w}_p^{(i)}$ is given by Table 1 (corresponding to Table 6.10.3.2-1 of TS 36.211):

TABLE 1

| The sequence $\bar{w}_p(i)$ for normal cyclic prefix | |
| --- | --- |
| Antenna port $p$ | $[\bar{w}_p(0) \; \bar{w}_p(1) \; \bar{w}_p(2) \; \bar{w}_p(3)]$ |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Figure 6:
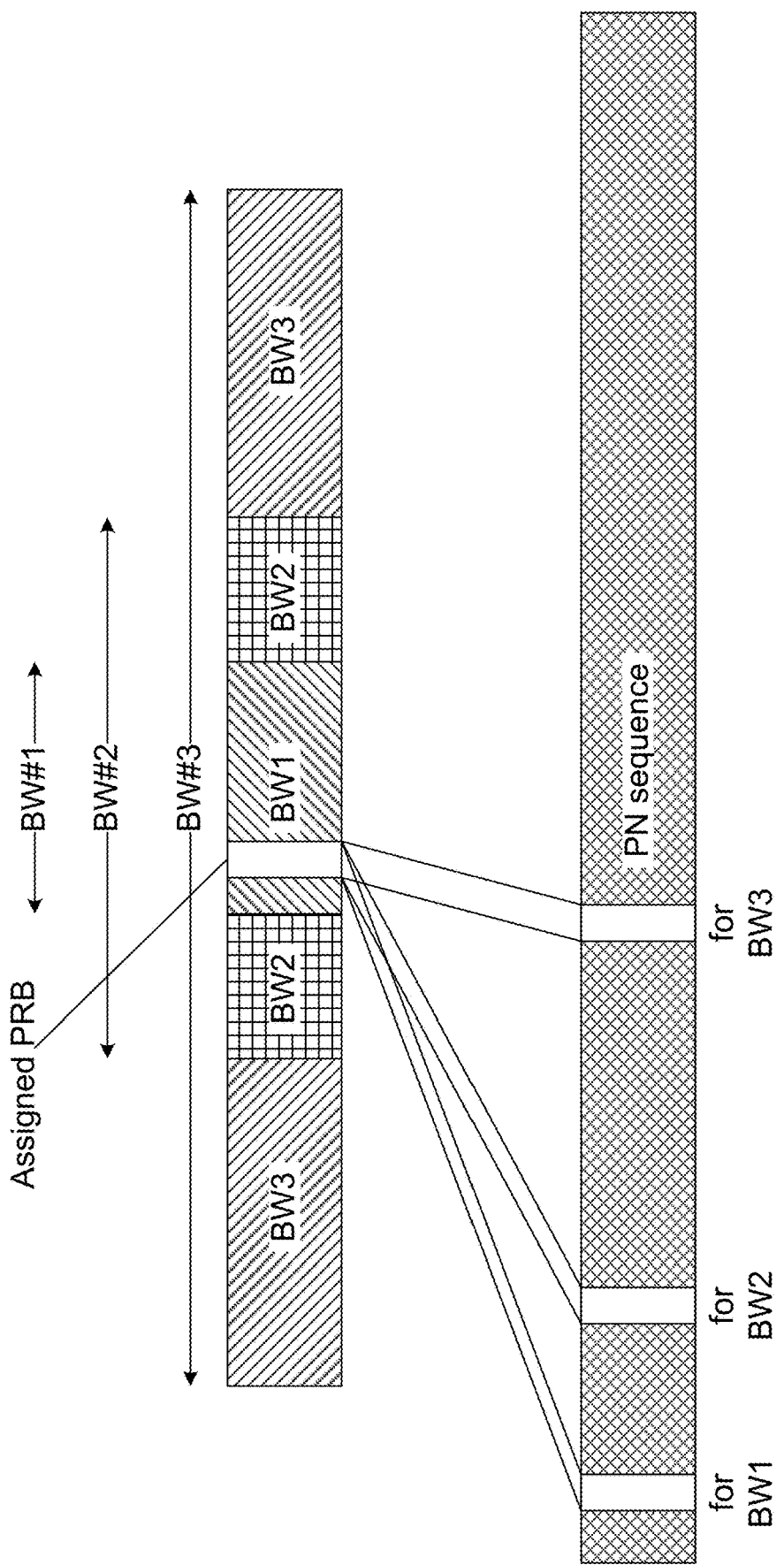
FIG. 6 is a diagram illustrating mapping of a PN (Pseudo-Noise) sequence to different PRBs (Physical Resource Blocks) for UE (User Equipment)-specific RS (Reference Signal(s)) for different UE BWs (Bandwidths) via LTE (Long Term Evolution)-based mapping, in connection with various aspects discussed herein.

Referring to FIG. 6, illustrated is a diagram showing mapping of a PN (Pseudo-Noise) sequence to different PRBs (Physical Resource Blocks) for UE (User Equipment)-specific RS (Reference Signal(s)) for different UE BWs (Bandwidths) via LTE-based mapping, in connection with various aspects discussed herein. FIG. 6 illustrates the generation procedure described above in connection with Equations (1)-(4) and Table 1, where a PN sequence is first obtained for the maximum number of PRBs denoted as $N_{RB}^{max,DL}$ and depending on the assigned PRB block number $n_{PRB}$ (which depends on the actual system BW), the appropriate portion of the sequence is extracted. It can be seen in FIG. 6 that UE(s) operating with different assumptions of the actual system bandwidth assigned with the same PRB in the physical domain will use different sequences, which can make DM-RS antenna port multiplexing using orthogonal codes not possible.

Accordingly, in a first set of aspects discussed herein, one or more techniques discussed herein can be employed for DM-RS sequence generation (e.g., via processor(s) 410 or processor(s) 510) for NR. These techniques can comprise techniques to generate (e.g., via processor(s) 410 or processor(s) 510) a PN sequence for DM-RS modulation that supports: (1) a nested structure, such that UEs (e.g., employing respective systems 400) operating under different assumptions of the actual system bandwidth can use the same part of the PN sequence to modulate DM-RS (e.g., via processor(s) 410 and transceiver circuitry 420) and (2) the sequence generation framework discussed herein is not limited by the maximum number of PRBs in the current release and can be reused for new maximum value of PRBs $N_{RB}^{max,DL} > N_{RB}^{max,DL}$ introduced in future NR release(s).

In a first set of embodiments associated with the first set of aspects, two PN sequences can be used (e.g., via processor(s) 410 or processor(s) 510) to generate the QPSK sequence for DM-RS REs modulation, wherein the first PN sequence (denoted herein as $c_1(n)$) can be used to modulate DM-RS REs with subcarrier indexes larger than a reference (e.g., central) subcarrier index (or frequency, e.g., which can be, in aspects, a center frequency between two subcarriers) and a second PN sequence (denoted herein as $c_2(n)$) can be used to modulate DM-RS REs with subcarrier indexes smaller than the reference subcarrier index. In various aspects, the QPSK sequence can be generated (e.g., by processor(s) 410 or processor(s) 510) as shown in equation (5):

$$r_{1,2}(m) = \frac{1}{\sqrt{2}}(1 - 2 \cdot c_{1,2}(2m)) + j\frac{1}{\sqrt{2}}(1 - 2 \cdot c_{1,2}(2m+1)), \quad (5)$$

$$m = 0, 1, \ldots, P \cdot N_{RB}^{max,DL} - 1,$$

where P is the number of REs per antenna port per PRB for DM-RS (e.g., generated by processor(s) 410 (or processor(s) 510, respectively), transmitted via transceiver circuitry 420 (or communication circuitry 520, respectively), received via communication circuitry 520 (or transceiver circuitry 420, respectively), and processed by processor(s) 410 (or processor(s) 510, respectively)). The mapping (e.g., by processor(s) 410 and transceiver circuitry 420 or processor(s) 510 and communication circuitry 520) of QPSK symbol to PRBs can be defined as shown in equation (6):

$$a_{k,l}^{(p)} = \begin{cases} r_1(k), & k \in k_{PRB}^+ \\ r_2(k), & k \in k_{PRB}^- \end{cases} \quad (6)$$

where $k_{PRB}^+$ corresponds to the set of assigned subcarriers with subcarrier indexes larger than the reference subcarrier index and $k_{PRB}^-$ corresponds to the set of assigned subcarriers with subcarrier indexes smaller than the reference subcarrier index.

Figure 7:
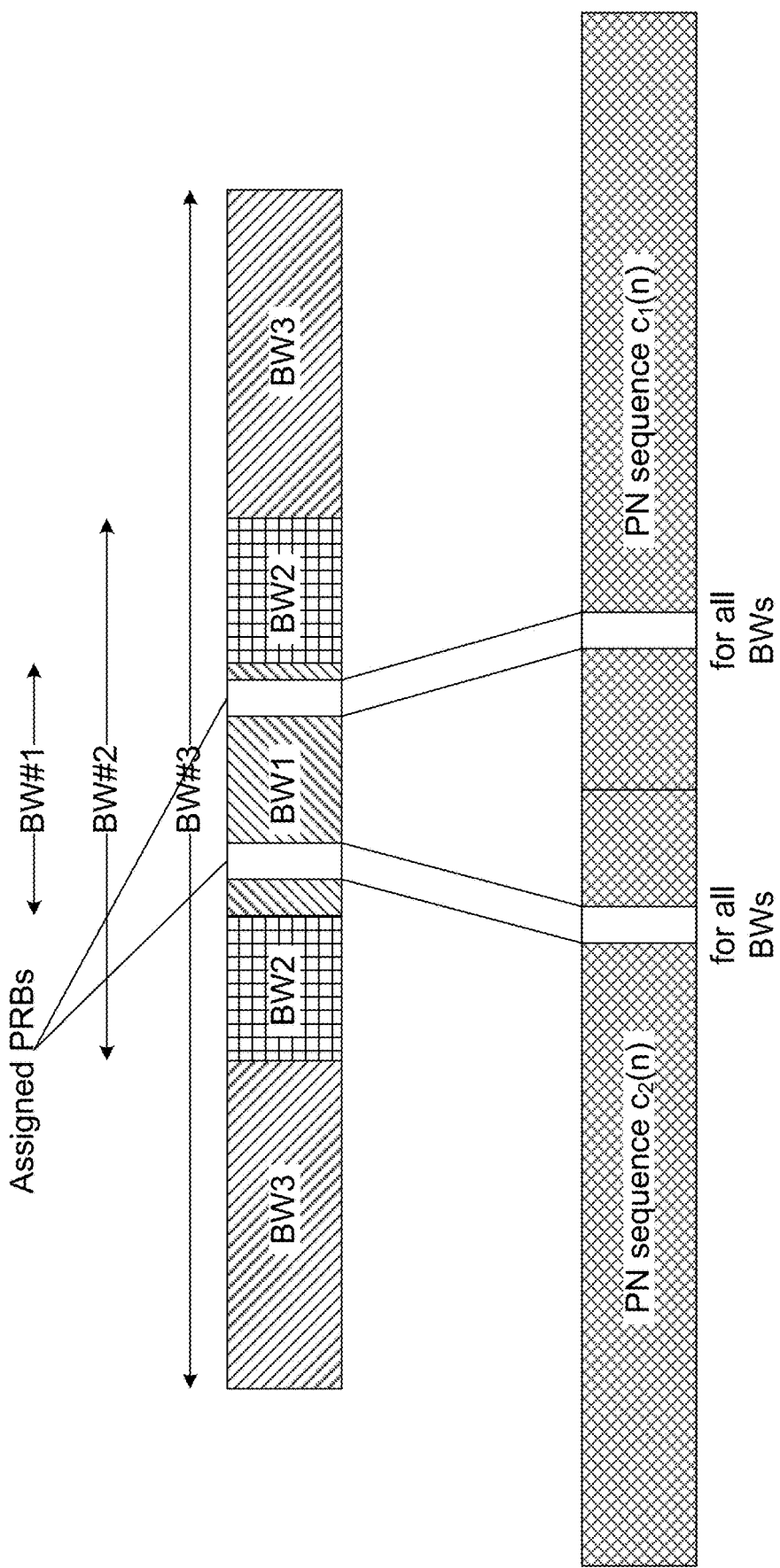
FIG. 7 is a diagram illustrating a first example mapping of PN sequences and corresponding QPSK (Quadrature Phase Shift Keying) symbol(s) to different PRB blocks, according to various aspects discussed herein.

In various aspects, the reference subcarrier index can correspond to a central subcarrier index of the SS block (e.g., generated by processor(s) 510, transmitted via communication circuitry 520, received via transceiver circuitry 420, and processed by processor(s) 410), a DC (Direct Current) subcarrier or another subcarrier index (or frequency, e.g., between two subcarriers) that can be indicated or configured by the gNB to the UE (e.g., via higher layer signaling generated by processor(s) 510, transmitted via communication circuitry 520, received via transceiver circuitry 420, and processed by processor(s) 410). Referring to FIG. 7, illustrated is a diagram showing a first example mapping of PN sequences and corresponding QPSK symbol(s) to different PRB blocks, according to various aspects discussed herein.

In contrast to conventional techniques, the first set of embodiments associated with the first set of aspects (as discussed in connection with equation (6) above and the associated mapping procedure), can also be used for new maximum value of PRBs $N'_{RB}^{max,DL} > N_{RB}^{max,DL}$.

In one example embodiment of the first set of embodiments associated with the first set of aspects, $c_1(n)$ and $c_2(n)$ can be two Gold sequences generated (e.g., by processor(s) 410 or processor(s) 510) using the same M-sequences with different initialization values. In another example embodiment of this first set of embodiments, $c_1(n)$ and $c_2(n)$ can be two Gold sequences that can be generated (e.g., by processor(s) 410 or processor(s) 510) using different M-sequences.

Figure 8:
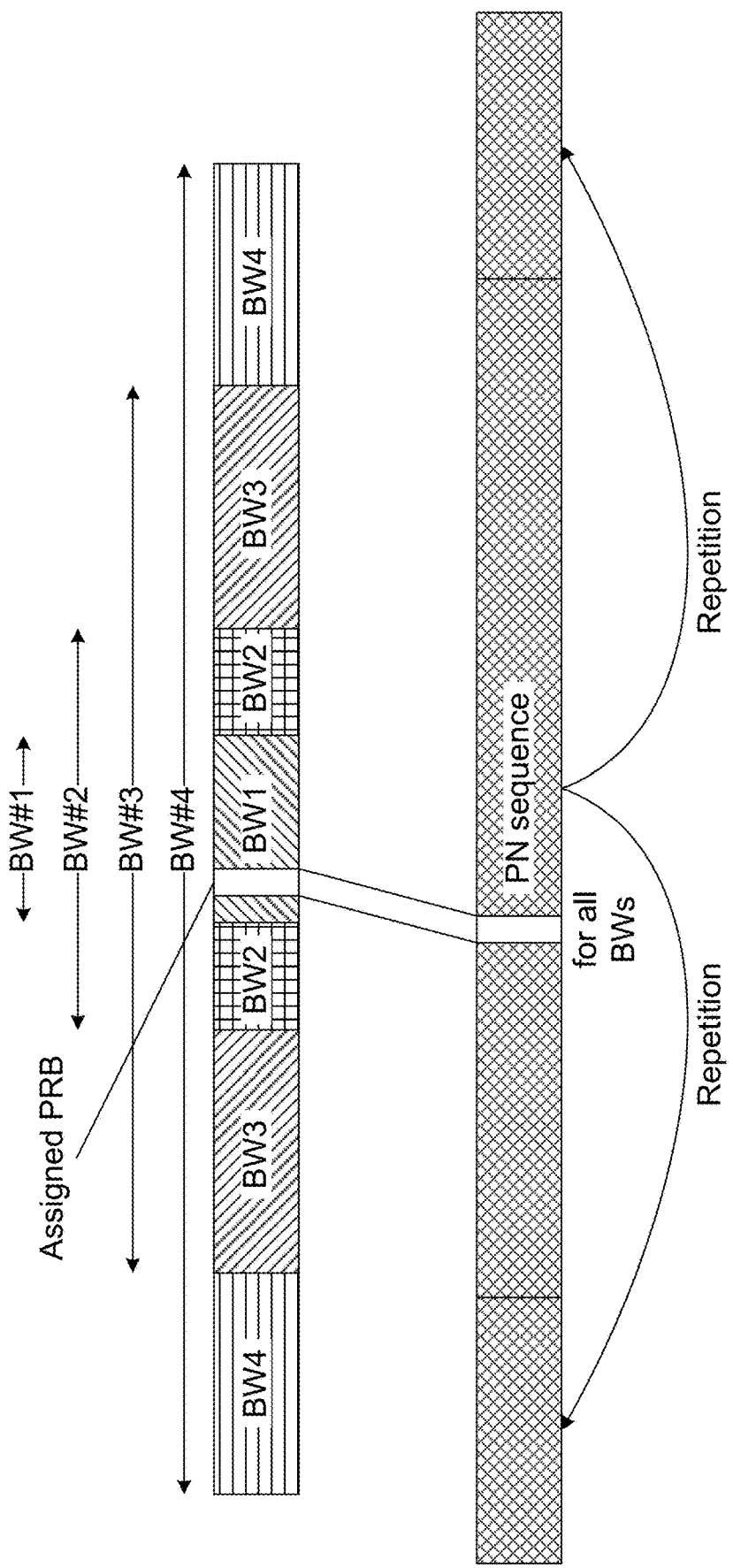
FIG. 8 is a diagram illustrating a second example mapping of PN sequences and corresponding QPSK symbol(s) to different PRB blocks, according to various aspects discussed herein.

In a second set of embodiments associated with the first set of aspects, the PN sequence can be generated (e.g., by processor(s) 410 or processor(s) 510) based at least in part on an assumed value for the maximum bandwidth (e.g, of $N_{RB}^{max,DL}$), which can be extended by repetition to support larger value of $N'_{RB}^{max,DL} > N_{RB}^{max,DL}$. Mapping of modulated QPSK symbol to PRBs (e.g., by processor(s) 410 and transceiver circuitry 420 or processor(s) 510 and communication circuitry 520) can follow a nested structure similar to the mapping supported by CRS (Cell-specific Reference Signal(s)). Referring to FIG. 8, illustrated is a diagram showing a second example mapping of PN sequences and corresponding QPSK symbol(s) to different PRB blocks, according to various aspects discussed herein.

The mapping illustrated in FIG. 8 and discussed above can be specified as in equation (7):

$$a_{k,l}^{(p)} = r(k \bmod N_{RB}^{max,DL}) \quad (7),$$

where the modulo operation can be used to achieve sequence wrap around (repetition), when the boundary of the QPSK modulated sequence length is achieved. In various aspects, the UE can also be configured (e.g., via higher layer signaling generated by processor(s) 510, transmitted via communication circuitry 520, received via transceiver circuitry 420, and processed by processor(s) 410) with a PRB block index offset that can be used to derive an offset $k_o$ for the mapping of QPSK modulated sequence onto assigned PRBs, as is equation (8):

$$a_{k,l}^{(p)} = r(k + k_0 \bmod N_{RB}^{max,DL}) \quad (8).$$

Figure 9:
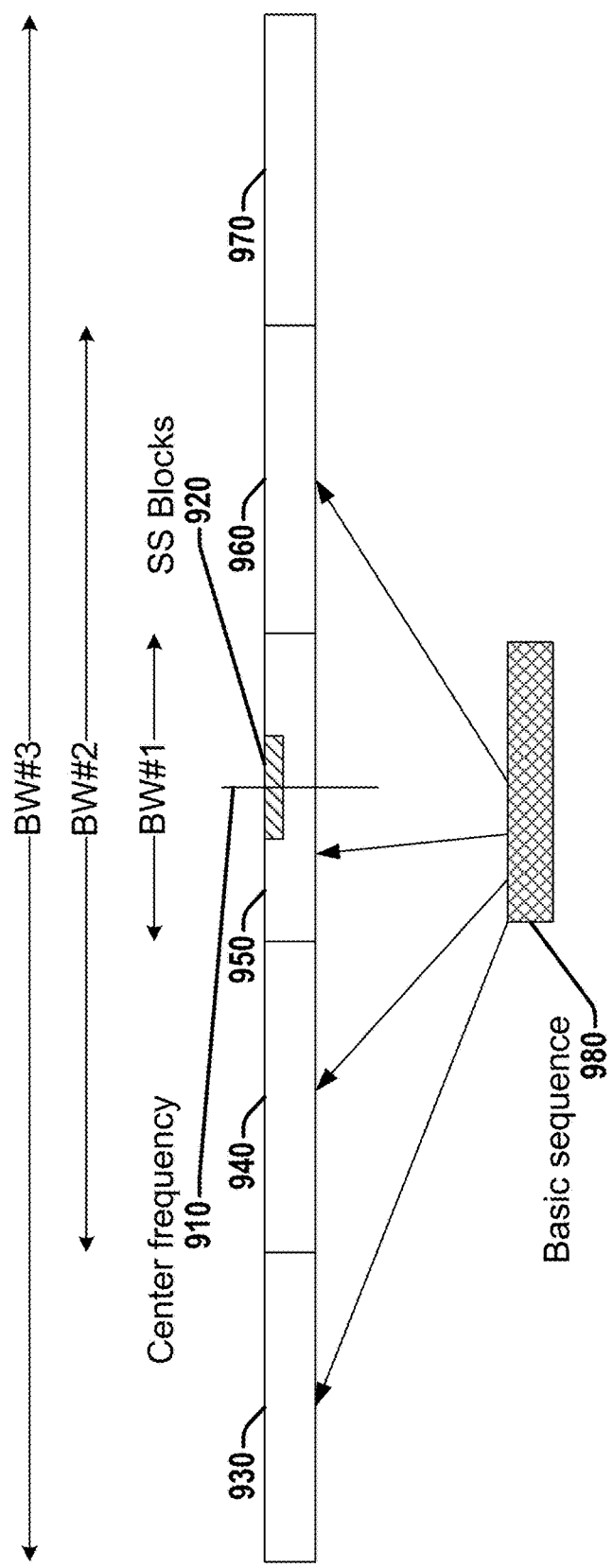
FIG. 9 is a diagram illustrating an example of short DM (Demodulation)-RS (Reference Signal) mapping for bandwidth extension, according to various aspects discussed herein.

In some embodiments of this second set of embodiments, the system bandwidth can be divided into multiple bandwidth parts (BPs). In various aspects, the reference subcarrier index of the system bandwidth can correspond to the central subcarrier index of the SS block, a DC subcarrier or another subcarrier index indicated or configured by the gNB to the UE (e.g., via higher layer signaling generated by processor(s) 510, transmitted via communication circuitry 520, received via transceiver circuitry 420, and processed by processor(s) 410). Referring to FIG. 9, illustrated is a diagram showing an example of short DM (Demodulation)-RS (Reference Signal) mapping for bandwidth extension, according to various aspects discussed herein. The m-sequence can be generated (e.g., by processor(s) 410 or processor(s) 510) as a short sequence 980 based at least in part on the length of a reference bandwidth part (BP) 950 in FIG. 9. In one example, the reference BP can be a minimum BP (e.g., comprising center frequency 910 and SS (Synchronization Signaling) Block(s) 920) or can be configurable through system information (e.g., generated by processor(s) 510, transmitted via communication circuitry 520, received via transceiver circuitry 420, and processed by processor(s) 410). Then, different sequences with the same length can be generated (e.g., by processor(s) 410 or processor(s) 510) based at least in part on the basic sequence 980 and the associated bandwidth part (BP) index of BPs 930-970. In various aspects, the BP index may be indexed relative to the central frequency. For example, the index of <BP 930, BP 940, BP 950, BP 960, BP 970>can be <−2, −1, 0, 1, 2>.

Figure 10:
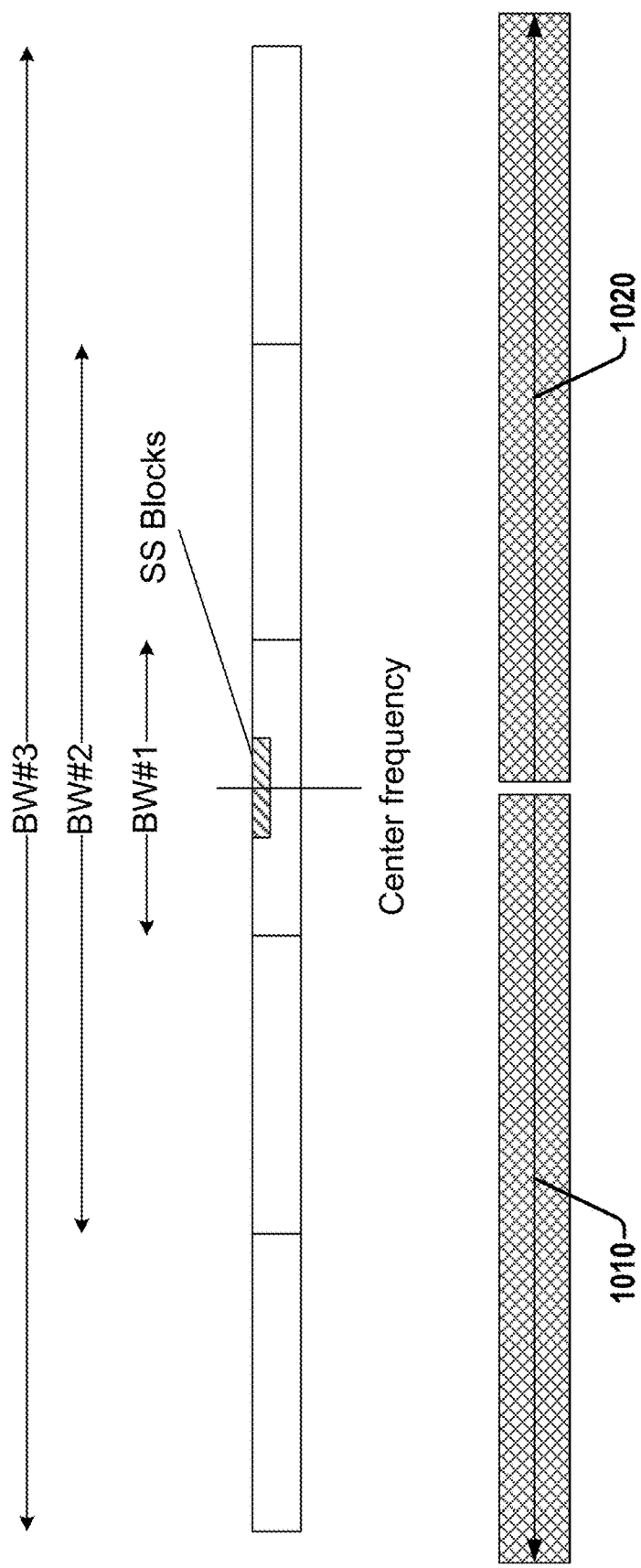
FIG. 10 is a diagram illustrating an example of dual DM (Demodulation)-RS (Reference Signal) sequence mapping for bandwidth extension, according to various aspects discussed herein.

In other embodiments of this second set of embodiments, two longer scrambling sequences can be used to generate DM-RS (e.g., via processor(s) 410 or processor(s) 510). Referring to FIG. 10, illustrated is a diagram showing an example of dual DM (Demodulation)-RS (Reference Signal) sequence mapping for bandwidth extension, according to various aspects discussed herein. In the example of FIG. 10, a first sequence 1010 can be used (e.g., by processor(s) 410 or processor(s) 510) to scramble the "negative subcarriers" (e.g., subcarriers with subcarrier indexes smaller than a reference (e.g., central) subcarrier index, starting from a reference (e.g., center) frequency in the order of decreasing frequency). Additionally, in the example of FIG. 10, a second sequence 1020 can be used (e.g., by processor(s) 410 or processor(s) 510) to scramble the "positive subcarriers" (e.g., subcarriers with subcarrier indexes larger than a reference (e.g., central) subcarrier index, starting from a reference (e.g., center) frequency in the order of increasing frequency). In various embodiments, the two bandwidths at either side of the reference frequency can be the same or different. Additionally, in aspects (e.g., when different), the two DM-RS sequences can be independently generated (e.g., by processor(s) 410 or processor(s) 510) based at least in part on the respective bandwidths of the two sides.

In various embodiments of the first set of aspects, a Gold sequence of larger length (e.g., greater than 31, such as 63, 127, etc.) can be specified to support PN sequence generation (e.g., by processor(s) 410) over a larger bandwidth (e.g., compared to LTE) supported by NR.

Additionally, in various embodiments of the first set of aspects, a binary maximum length sequence (e.g., which can be referred to as an m-sequence) can be used (e.g., by processor(s) 410 and transceiver circuitry 420 or processor(s) 510 and communication circuitry 520) as the base scrambling sequence. In various embodiments, an m-sequence can be generated (e.g., by processor(s) 410 and transceiver circuitry 420 or processor(s) 510 and communication circuitry 520) with a linear feedback shift register (LFSR) that can implement a primitive polynomial. In some embodiments, the coefficients of the generator polynomial for DM-RS can be fixed in a specification (e.g., 3GPP specification).

Precoder Assignment for NR (New Radio)

MIMO (Multiple Input Multiple Output) systems employ a plurality of Tx (Transmit) and Rx (Receive) antennas to provide spatial diversity, multiplexing and array gains in the DL (Downlink) and UL (Uplink) channels. In the DL, the Tx performance of the BS (e.g., TRP (Tx/Rx Point) such as a gNB, eNB, etc., employing system 500) can be improve by using CSI (Channel State Information) about the DL channel observed (e.g., via communication circuitry 520 and processor(s) 510) via Rx antennas. The CSI can be obtained by the BS from the UE as follows: (a) from estimation (e.g., via processor(s) 510) of the UL channel (e.g., as received via communication circuitry 520) and by using channel reciprocity of the wireless channel or (b) from quantized feedback received via the Rx antennas (e.g., generated by processor(s) 410, transmitted via transceiver circuitry 420, received via communication circuitry 520, and processed by processor(s) 510).

The quantized form of CSI feedback is more general and can be used for both FDD (Frequency Division Duplexing) and TDD (Time Division Duplexing) systems. The quantized CSI can comprise the precoding matrix index (PMI) to assist beamforming or precoding selection (e.g., via processor(s) 510, which can be applied by communication circuitry 520) for the Tx antennas of the BS. The set of possible PMIs is referred to as a codebook. For different possible deployments of NR, the codebook can be designed to provide reasonable performance in all possible serving directions of the TRP.

In order to improve the performance for DM (Demodulation)-RS (Reference Signal(s))-based transmission mode(s) RB (Resource Block) bundling (into PRGs (Precoding Resource block Groups) of P (a positive integer) PRB(s) (Physical Resource Blocks)) can be employed (e.g., by processor(s) 410 and processor(s) 510). In accordance with the LTE (Long Term Evolution) Rel-10 (Release 10), if the UE (e.g., employing system 400) is configured with PMI/RI (Rank Indicator) reporting, the UE can assume (e.g., via processor(s) 410) the same precoding vector over some of the adjacent RBs (e.g., those in the same PRG). In such scenarios, the channel estimation (e.g., performed via processor(s) 410 based at least in part on signals, noise, and/or interference received via transceiver circuitry 420) can be improved by averaging (e.g., via processor(s) 410) over a larger number of RBs. 3GPP TS 36.213 discusses this bundling at 7.1.6.5 ("Precoding PRB bundling"):

A UE configured for transmission mode 9 for a given serving cell c may assume that precoding granularity is multiple resource blocks in the frequency domain when PMI/RI reporting is configured.

For a given serving cell c, if a UE is configured for transmission mode 10 if PMI/RI reporting is configured for all configured CSI processes for the serving cell c, the UE may assume that precoding granularity is multiple resource blocks in the frequency domain, otherwise, the UE [can] assume the precoding granularity is one resource block in the frequency domain.

Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL} - P' \lfloor N_{RB}^{DL}/P' \rfloor$. The PRG size is non-increasing starting at the lowest frequency. The UE may assume that the same precoder applies on all scheduled PRBs within a PRG.

The PRG size a UE may assume for a given system bandwidth is given by:

TABLE 7.1.6.5-1

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

However, in NR UE bandwidth assumptions can vary, thus UE(s) (e.g., employing respective system(s) 400) operating with different assumptions of the actual system bandwidth can have assigned PRGs (and thus precoding) that depend on the assumed system bandwidth if assigned in a conventional manner, which can be detrimental to CSI determination at the BS (e.g., via processor(s) 510 and communication circuitry 520). Accordingly, in a second set of aspects discussed herein, techniques are discussed that can facilitate PRG assignment to PRBs. These techniques can facilitate precoding assignment that can be independent of UE assumptions of system bandwidth, and thus can facilitate improved CSI determination compared to conventional systems. In various embodiments of the second set of aspects, two approaches can be employed for precoding assignment to PRBs: (a) cell-specific PRG assignment, wherein PRG(s) can be assigned to P consecutive PRBs starting from a reference (e.g., center) PRB (or frequency between two PRBs, etc.), such as the center of an SS (Synchronization Signal) block or (b) UE-specific PRG assignment, wherein PRG(s) can be assigned to P consecutive PRBs starting from a reference PRB index (e.g., a center, lowest, highest, etc. PRB index of one of the UE resource allocation or configured bandwidth part).

Figure 11:
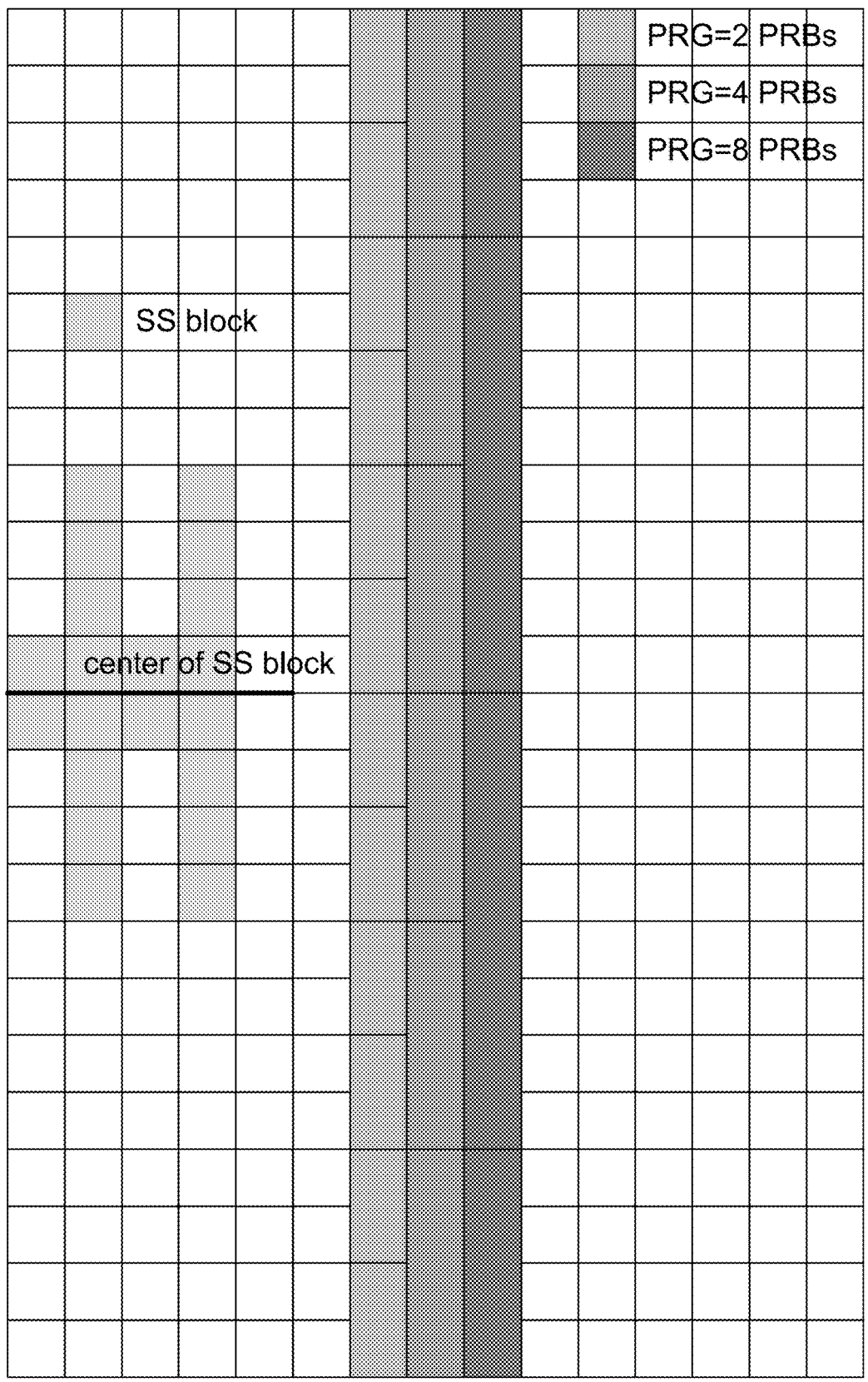
FIG. 11 is a diagram illustrating an example of PRG (PRB Group) assignment according to a first technique, according to various aspects discussed herein.

Referring to FIG. 11, illustrated is a diagram showing an example of PRG assignment according to a first technique, according to various aspects discussed herein. In a first set of embodiments (e.g., employing the first technique) associated with the second set of aspects, cell-specific PRG assignment can be employed (e.g., which can be indicated via higher layer signaling generated by processor(s) 510, transmitted via communication circuitry 520, received via transceiver circuitry 420, and processed by processor(s) 410), where each PRG can be assigned (e.g., by processor(s) 410 and processor(s) 510) to P consecutive PRBs starting from a reference PRB (or frequency between a pair of adjacent PRBs, etc.). In various aspects of this first set of embodiments, the reference PRB (etc.) can be, for example, the center of the SS block (e.g., generated by processor(s) 510, transmitted by communication circuitry 520, received by transceiver 420, and processed by processor(s) 410). In this first set of embodiments, as shown in the example of FIG. 11, consecutive PRBs belonging to the same PRG are assigned (e.g., by processor(s) 410 and processor(s) 510) starting from the center of the SS block. In various aspects, on the edge of the frequency band, the number of PRBs in the outermost PRG(s) can be reduced if the number of PRBs in the band (or the half of the band, relative to the center of the SS block) is not evenly divisible by the PRG size of P (e.g., if P does not divide the number of PRBs in the band (or the half of the band) without remainder).

Figure 12:
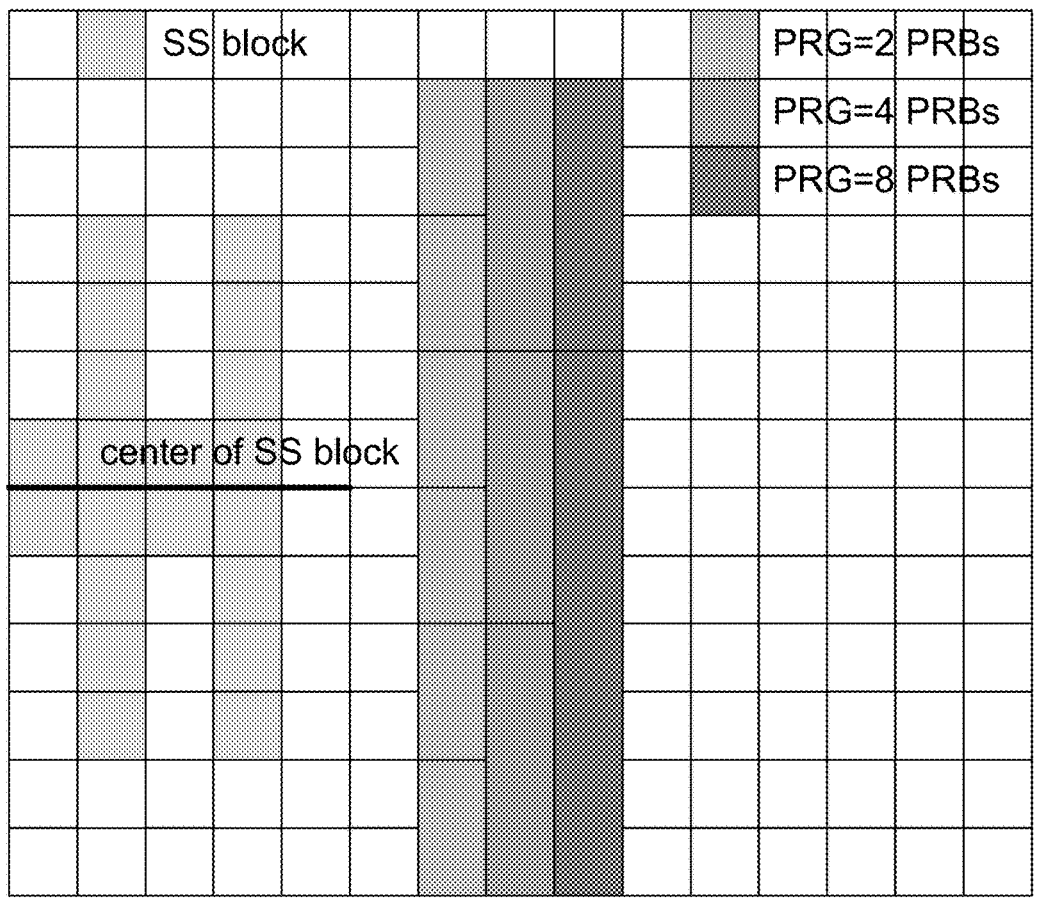
FIG. 12 is a diagram illustrating an example of PRG assignment according to a second technique, according to various aspects discussed herein.

Referring to FIG. 12, illustrated is a diagram showing an example of PRG assignment according to a second technique, according to various aspects discussed herein. In a second set of embodiments (e.g., employing the second technique) associated with the second set of aspects, UE-specific PRG assignment can be employed (e.g., which can be indicated via higher layer signaling generated by processor(s) 510, transmitted via communication circuitry 520, received via transceiver circuitry 420, and processed by processor(s) 410) where each PRG can be assigned (e.g., by processor(s) 410 and processor(s) 510) to P consecutive PRBs starting from a reference PRB (or frequency between a pair of adjacent PRBs, etc.). In various aspects of this second set of embodiments, the reference PRB (etc.) can be, for example, a lowest PRB index, a highest PRB index, or a center PRB index of one of a resource allocation of the UE or a configured BW part for the UE.

The example shown in FIG. 12 is an embodiment of this second set of embodiments wherein PRGs can be assigned (e.g., by processor(s) 410 and processor(s) 510) to PRBs starting from the highest (corresponding to the bottom part of the figure) PRBs indexes within the resource allocation or configured bandwidth part. In various aspects, if the number of PRBs in the resource allocation or configured bandwidth is not an integer multiple of resource allocation or configured bandwidth part, the number of PRBs can be reduced in the PRG(s) on one or both of the edge(s) of the resource allocation or configured bandwidth.

Additionally, in various embodiments (e.g., of the first or second set) of the second set of aspects, the UE can assume, for each PRG, the same precoder within all PRBs of that PRG.

DM-RS Sequence Generation and Mapping for New Radio (NR)

As agreed in NR, from the perspective of the RAN1 (RAN (Radio Access Network) WG1 (Working Group 1)) specification, the maximum channel bandwidth per NR carrier is 400 MHz in Rel-15 (LTE Release 15). Additionally, for a UE not capable of supporting the carrier bandwidth, resource allocation for data transmission can be derived based on a two-step frequency-domain assignment process: (1) indication of a bandwidth part (e.g., via higher layer signaling generated by processor(s) 510, transmitted by communication circuitry 520, received by transceiver circuitry 420, and processed by processor(s) 410) and (2) indication of the PRBs within the bandwidth part (e.g., via higher layer signaling generated by processor(s) 510, transmitted by communication circuitry 520, received by transceiver circuitry 420, and processed by processor(s) 410). For a given UE, one or multiple bandwidth part configurations for each component carrier can be semi-statically signaled to a UE (e.g., via signaling generated by processor(s) 510, transmitted by communication circuitry 520, received by transceiver circuitry 420, and processed by processor(s) 410). Configuration of the bandwidth part can also include numerology, frequency location and bandwidth.

Figure 13:
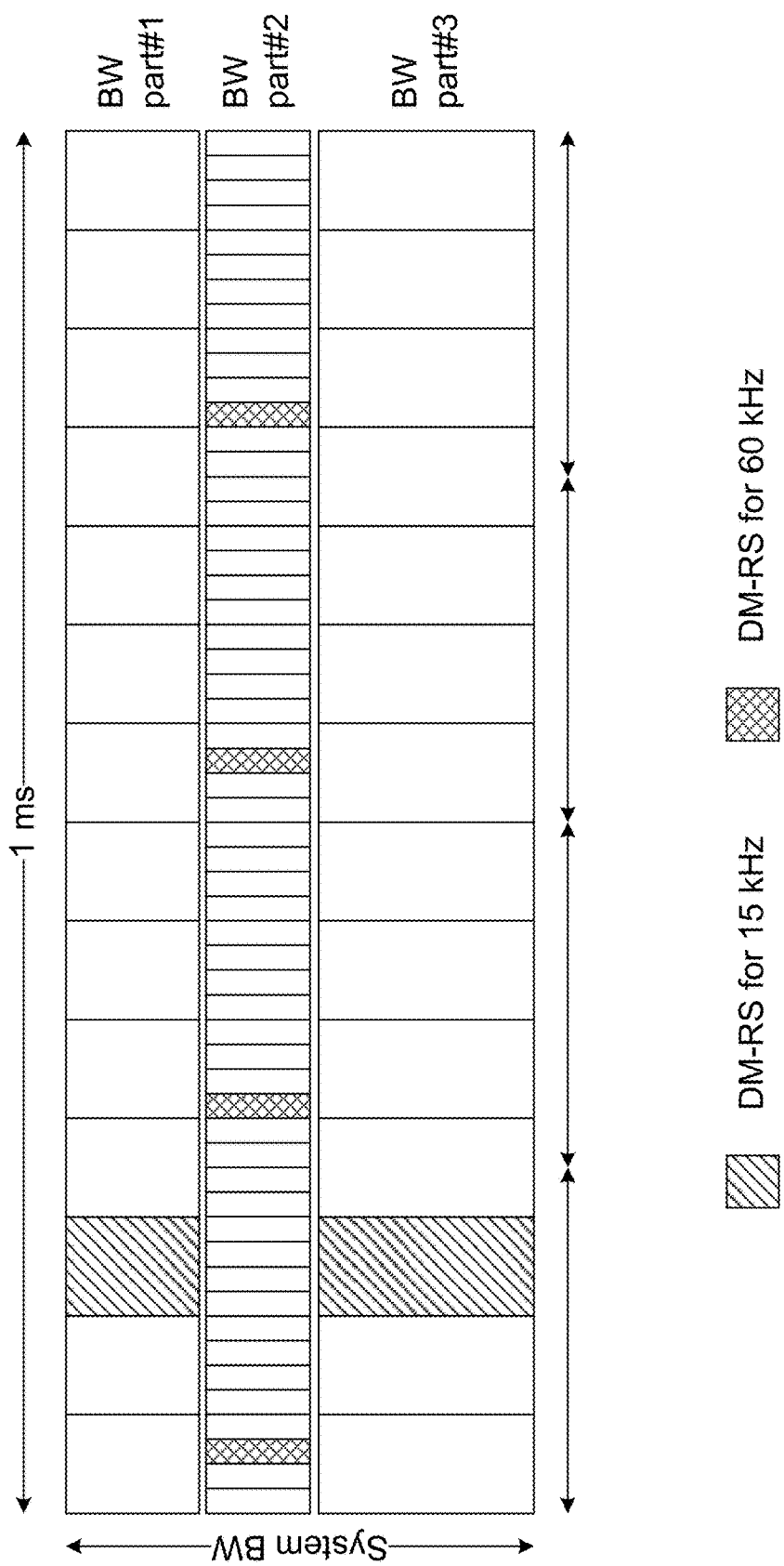
FIG. 13 is a diagram illustrating an example of DM-RS for multiple BW (Bandwidth) parts configured with different numerologies, in connection with various aspects discussed herein.

Referring to FIG. 13, illustrated is a diagram showing an example of DM-RS for multiple BW parts configured with different numerologies, in connection with various aspects discussed herein. In the example of FIG. 13, bandwidth parts #1 and #3 are configured with 15 kHz subcarrier spacing and a slot duration of 1 ms, while bandwidth part #2 is configured with 60 kHz subcarrier spacing and a slot duration of roughly 0.25 ms. Additionally, as agreed in NR, symbol level alignment across different subcarrier spacings with the same CP (Cyclic Prefix) overhead can be assumed (e.g., by processor(s) 410 and processor(s) 510) within a subframe duration in a NR carrier.

For NR, DM (Demodulation)-RS (Reference Signal(s)) can occupy a partial system bandwidth in scenarios wherein the UE is not capable of supporting the whole carrier bandwidth, as shown in the example of FIG. 13. Depending on whether the UE is configured with one or more BW parts, DM-RS sequence generation and mapping may need to be defined.

Accordingly, in various embodiments of a third set of aspects discussed herein, techniques are discussed that can facilitate DM-RS sequence generation and mapping for NR. In various aspects, these techniques can comprise: (1) DM-RS sequence generation and mapping in frequency; (2) DM-RS sequence generation and mapping in time; and (3) scrambling sequence generation for data and control channel(s).

DM-RS Sequence Generation and Mapping in Time

In LTE, Demodulation reference signal (DM-RS) is only transmitted in the resource blocks assigned for transmission to a given UE. Additionally, DM-RS is generated based on a pseudo-random sequence, wherein the initialization seed is defined as a function of one or more of a physical cell ID (Identifier), a virtual cell ID, a slot index, or a scrambling ID, which can be indicated in the downlink control information (DCI) (e.g., generated by processor(s) 510, transmitted by communication circuitry 520, received by transceiver circuitry 420, and processed by processor(s) 410).

For NR, a similar mechanism can be applied for DM-RS sequence generation, as discussed in greater detail below. For example, the initialization seed for pseudo-random sequence for DM-RS sequence generation can be defined as a function of one or more of a physical cell ID, a virtual cell ID, a slot index, or a scrambling ID, which can be indicated in the downlink control information (DCI) (e.g., generated by processor(s) 510, transmitted by communication circuitry 520, received by transceiver circuitry 420, and processed by processor(s) 410). Additionally, it also can be defined as a function of one or more of the following parameters: symbol index or UE ID (e.g., Cell Radio Network Temporary Identifier (C-RNTI)).

In scenarios wherein a UE is allocated with two or more bandwidth parts, in various embodiments, DM-RS sequence generation and resource mapping can be employed as discussed below.

Figure 14:
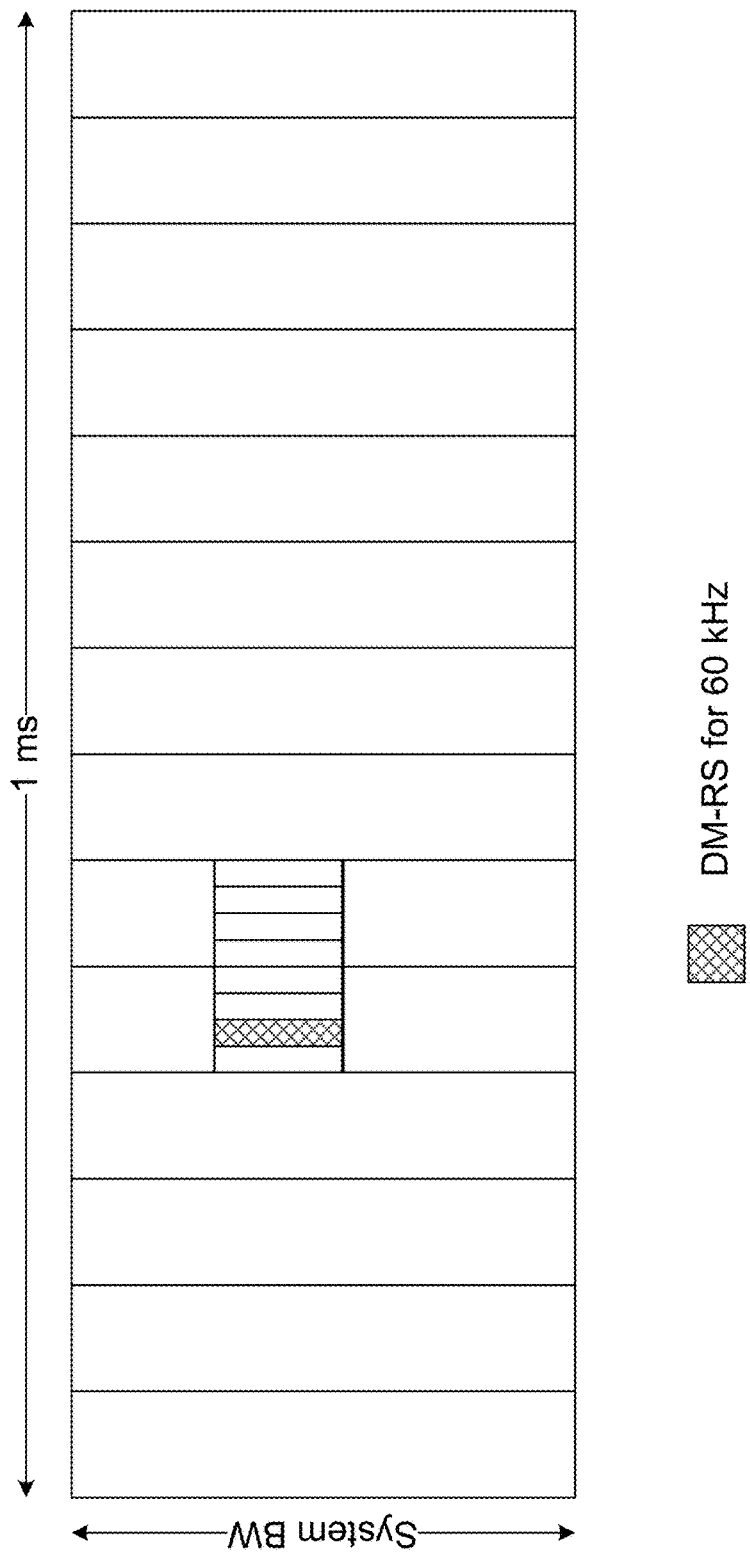
FIG. 14 is a diagram illustrating an example of symbol level based transmission of DM-RS, according to various aspects discussed herein.

Additionally, although only one DM-RS symbol is shown in the example of FIG. 14 and as discussed below, in various embodiments, the same techniques can be extended to other scenarios, such as scenarios with two front-loaded DM-RS symbols and scenarios wherein additional DM-RS is configured in the second part of the slot.

In a first set of embodiments associated with the third set of aspects, in scenarios wherein the same numerology is applied for two or more bandwidth parts, a long pseudo-random sequence in accordance with the total bandwidth of the two or more bandwidth parts and numerology can be generated (e.g., by processor(s) 410 or processor(s) 510) for DM-RS.

Referring again to the example shown in FIG. 13, a UE can be configured (e.g., via higher layer signaling generated by processor(s) 510, transmitted by communication circuitry 520, received by transceiver circuitry 420, and processed by processor(s) 410) with bandwidth part #1 and #3 for data transmission, wherein 5 MHz and 10 MHz can be allocated for bandwidth part #1 and #3, respectively. Given that the same numerology of 15 kHz is employed, a long pseudo-random sequence based on a 15 MHz (5 MHz+10 MHz) bandwidth and 15 kHz subcarrier spacing can be generated (e.g., by processor(s) 410 or processor(s) 510) for DM-RS, according to the first set of embodiments of the third set of aspects.

In a second set of embodiments associated with the third set of aspects, in scenarios wherein the same or different numerologies are applied for two or more bandwidth parts, independent pseudo-random sequence(s) in accordance with the different bandwidth parts and associated numerologies can be generated (e.g., by processor(s) 410 or processor(s) 510) for DM-RS in each bandwidth part.

Referring again to the example shown in FIG. 13, a UE can be configured with bandwidth part #1 and #2 for data transmission, wherein bandwidth part #1 with 5 MHz is configured with 15 kHz subcarrier spacing and bandwidth part #2 with 5 MHz is configured with 60 kHz subcarrier spacing. In such scenarios, an independent sequence can be generated (e.g., by processor(s) 410 or processor(s) 510) for each bandwidth part for DM-RS.

Additionally, in various such aspects, the pseudo-random sequence in each bandwidth part can be further defined as a function of bandwidth part index or another parameter associated with each bandwidth part, which can help randomize the interference in the frequency domain. In various such aspects, the parameter can be one of predefined in the specification or configured by higher layer signaling via one of NR minimum system information (MSI), NR remaining minimum system information (RMSI), NR other system information (OSI) or radio resource control (RRC) signaling; or dynamically indicated in the DCI or a combination thereof (e.g., generated by processor(s) 510, transmitted by communication circuitry 520, received by transceiver circuitry 420, and processed by processor(s) 410).

In various aspects, the scrambling ID can be different for each bandwidth part and/or can be dynamically signaled in the DCI (e.g., generated by processor(s) 510, transmitted by communication circuitry 520, received by transceiver circuitry 420, and processed by processor(s) 410). Alternatively, a predefined or configured offset for scrambling IDs between bandwidth parts can be defined, which can help reduce signaling overhead in the DCI.

In aspects, for a given bandwidth part, the UE can be configured with two or more virtual cell IDs to support dynamic switching between transmit points (TP).

DM-RS Sequence Generation and Mapping in Time

As discussed above, the initialization seed for pseudo-random sequence for DM-RS sequence generation can be defined as a function of one or more of the following parameters: a physical cell ID, a virtual cell ID, a slot index, a symbol index, a frame index, a scrambling ID or a UE ID.

In a third set of embodiments associated with the third set of aspects, the slot index can be defined in accordance with a reference numerology. In various aspects, the reference numerology can be different in different carrier frequencies. As an example, for a carrier frequency below 6 GHz, a 15 kHz subcarrier spacing can be considered as the reference numerology, while for a carrier frequency above 6 GHz, a 60 kHz or a 120 Kkz subcarrier spacing can be considered as the reference numerology. Alternatively, the reference numerology can be the numerology of a beam management reference signal (e.g., SS-block or CSI-RS) which can be configured or indicated in a default or indicated beam pair link (BPL) (e.g., via higher layer signaling or DCI generated by processor(s) 510, transmitted via communication circuitry 520, received via transceiver circuitry 420, and processed by processor(s) 410).

In such scenarios, a long sequence can be generated (e.g., by processor(s) 410 or processor(s) 510) within one slot and one bandwidth part in accordance with reference numerology. Depending on the number of DM-RS symbols configured within one slot using reference numerology, the DM-RS sequence can be mapped accordingly to each DM-RS symbol (e.g., by processor(s) 410 and transceiver circuitry 420 or processor(s) 510 and communication circuitry 520).

As an example, referring again to FIG. 13, in bandwidth part #2, the DM-RS sequence can be generated (e.g., by processor(s) 410 or processor(s) 510) as a function of slot index which is based on a reference numerology, for example, 15 kHz. In such scenarios, a long sequence can be generated (e.g., by processor(s) 410 or processor(s) 510) for DM-RS based on a 1 ms slot duration. Given that 4 DM-RS symbols are used within 1 ms, the long DM-RS sequence can be mapped (e.g., by processor(s) 410 and transceiver circuitry 420 or processor(s) 510 and communication circuitry 520) into the 4 DM-RS symbols, wherein the first part of the DM-RS sequence can be mapped to the first DM-RS symbol, the second part of the DM-RS sequence can be mapped to the second DM-RS symbol, and so on.

Additionally, in various aspects, the symbol index can be included in the DM-RS sequence generation (e.g., by processor(s) 410 or processor(s) 510) in addition to the slot index. Referring to FIG. 14, illustrated is a diagram showing an example of symbol level based transmission of DM-RS, according to various aspects discussed herein. In embodiments such as the example of FIG. 14, data transmission can span a few symbols with regard to the reference numerology. In such scenarios, the DM-RS sequence can be generated (e.g., by processor(s) 410 or processor(s) 510) as a function of symbol index and slot index, in accordance with reference numerology.

In a fourth set of embodiments associated with the third set of aspects, slot index can be defined in accordance with an associated numerology in each bandwidth part. For instance, assuming a 10 ms frame duration, the slot index for a 15 kHz subcarrier spacing is from 0 to 9, while for a 60 kHz subcarrier spacing, the slot index is from 0 to 39. Similarly, a long sequence can be generated (e.g., by processor(s) 410 or processor(s) 510), wherein the total length of the long sequence can be determined based at least in part on the number of DM-RS symbols in a slot of the associated numerology. In such scenarios, a different part of the DM-RS sequence can be mapped (e.g., by processor(s) 410 and transceiver circuitry 420 or processor(s) 510 and communication circuitry 520) to different DM-RS symbols accordingly.

Alternatively, in scenarios wherein at least one additional DM-RS symbol is configured, the symbol index can be included in the generation (e.g., by processor(s) 410 or processor(s) 510) of DM-RS. For instance, additional DM-RS symbol can be configured (e.g., via higher layer signaling generated by processor(s) 510, transmitted via communication circuitry 520, received via transceiver circuitry 420, and processed by processor(s) 410) in the second half of one slot. In this case, separate DM-RS sequence is generated for each DM-RS symbol within one slot.

In various embodiments of the third set of aspects, similar techniques can be applied for the sequence generation (e.g., by processor(s) 410 or processor(s) 510) of other reference signals, for example, Phase Tracking Reference Signal (PT-RS), sounding reference signal (SRS), channel state information reference signal (CSI-RS), etc.

Scrambling Sequence Generation for Data and Control Channel

In LTE, the scrambling sequence(s) for data and control channel(s) can be generated (e.g., via processor(s) 410 or processor(s) 510) as a function of one or more of cell ID, slot index or RNTI. For NR, due to multiplexing of different numerologies in the same bandwidth and symbol level transmission of data and control channel scrambling sequence generation can be updated accordingly.

In a fifth set of embodiments associated with the third set of aspects, the scrambling sequence can be generated (e.g., by processor(s) 410 or processor(s) 510) as a function of the scrambling seed can be defined as a function of one or more of the following parameters: a physical cell ID, a virtual cell ID, a frame and/or slot and/or symbol index for the transmission of the data and/or control channel(s), and/or a suitable identifier (e.g., RNTI).

Additionally, in scenarios involving mini-slot aggregation, the symbol index can be used for the scrambling sequence generation (e.g., by processor(s) 510) for the DL control and/or data channel(s) can be defined in accordance with the first symbol scheduled for the transmission. Similarly, in scenarios involving slot aggregation when one transport block (TB) spans multiple slots, the slot index used for the scrambling sequence generation (e.g., by processor(s) 510) for the DL control and/or data channel(s) can be defined in accordance with the first slot scheduled for the transmission.

Additionally, as discussed above, slot index can be either determined in accordance with the reference numerology or the numerology associated with each bandwidth part. In scenarios wherein the slot index is determined (e.g., by processor(s) 410 or processor(s) 510) based at least in part on the reference numerology, and when symbol level based transmission (e.g., by transceiver circuitry 420 and communication circuitry 520) for the data and/or control channel(s) (e.g., generated by processor(s) 410 (or processor(s) 510, respectively), transmitted via transceiver circuitry 420 (or communication circuitry 520, respectively), received via communication circuitry 520 (or transceiver circuitry 420, respectively), and processed by processor(s) 410 (or processor(s) 510, respectively)) is employed, the symbol index in accordance with the reference numerology can also be included in the scrambling sequence generation (e.g., by processor(s) 410 or processor(s) 510).

Additional Embodiments

Figure 15:
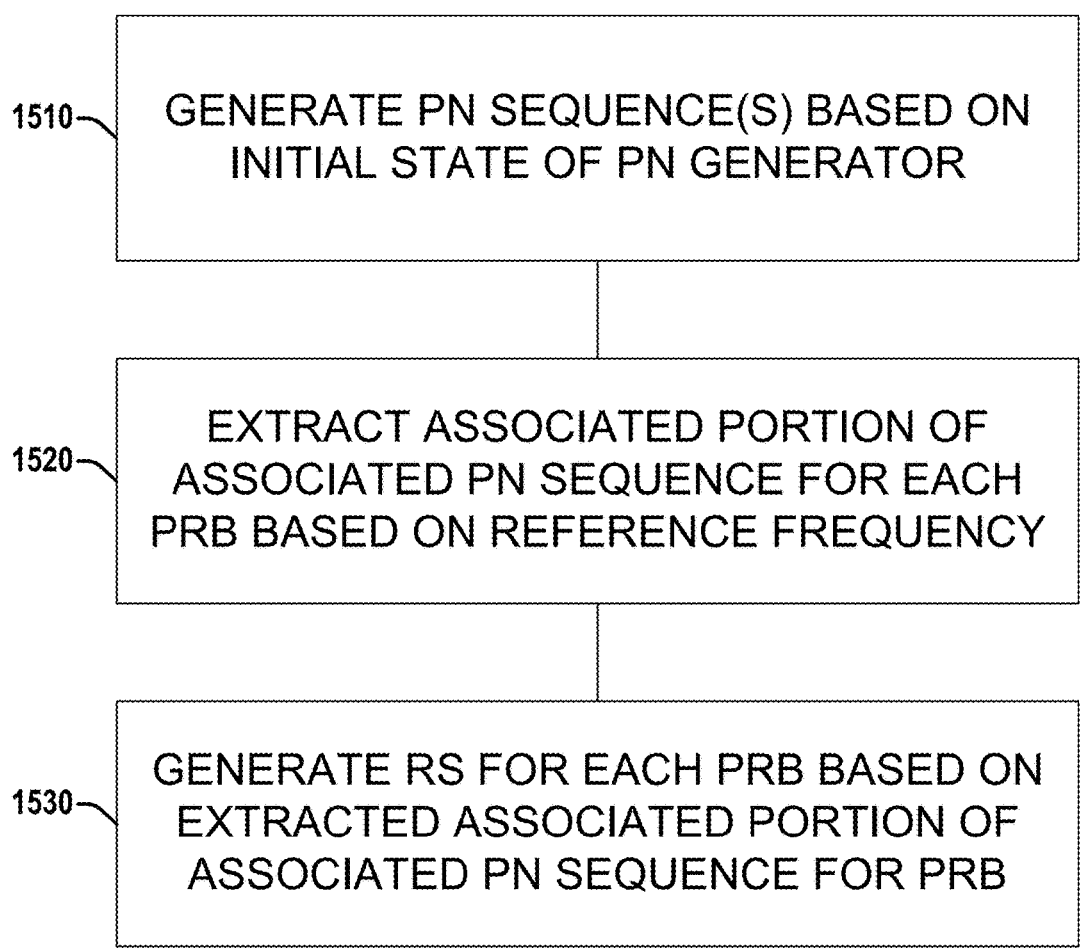
FIG. 15 is a flow diagram of an example method employable at a NR wireless communication device that facilitates RS (Reference Signal) sequence generation and mapping for NR, according to various aspects discussed herein.

Referring to FIG. 15, illustrated is a flow diagram of an example method 1500 employable at a NR (New Radio) wireless communication device (e.g., gNB, UE, etc.) that facilitates RS (Reference Signal) sequence generation and mapping for NR, according to various aspects discussed herein. In other aspects, a machine readable medium can store instructions associated with method 1500 that, when executed, can cause a NR wireless communication device to perform the acts of method 1500.

At 1510, one or more PN sequences can be generated based on an initial state of a PN generator.

At 1520, for each PRB of one or more PRBs, an associated portion of an associated PN sequence can be extracted, based on a reference frequency, and independent of a BW part configuration and/or maximum number of configured PRBs.

At 1530, RS can be generated (e.g., via QPSK modulation, mapping, etc.) for each PRB based on the extracted associated portion of the associated PN sequence for that PRB.

Additionally or alternatively, method 1500 can include one or more other acts described herein in connection with various embodiments of system 400 or system 500 discussed herein in connection with the first set of aspects.

Figure 16:
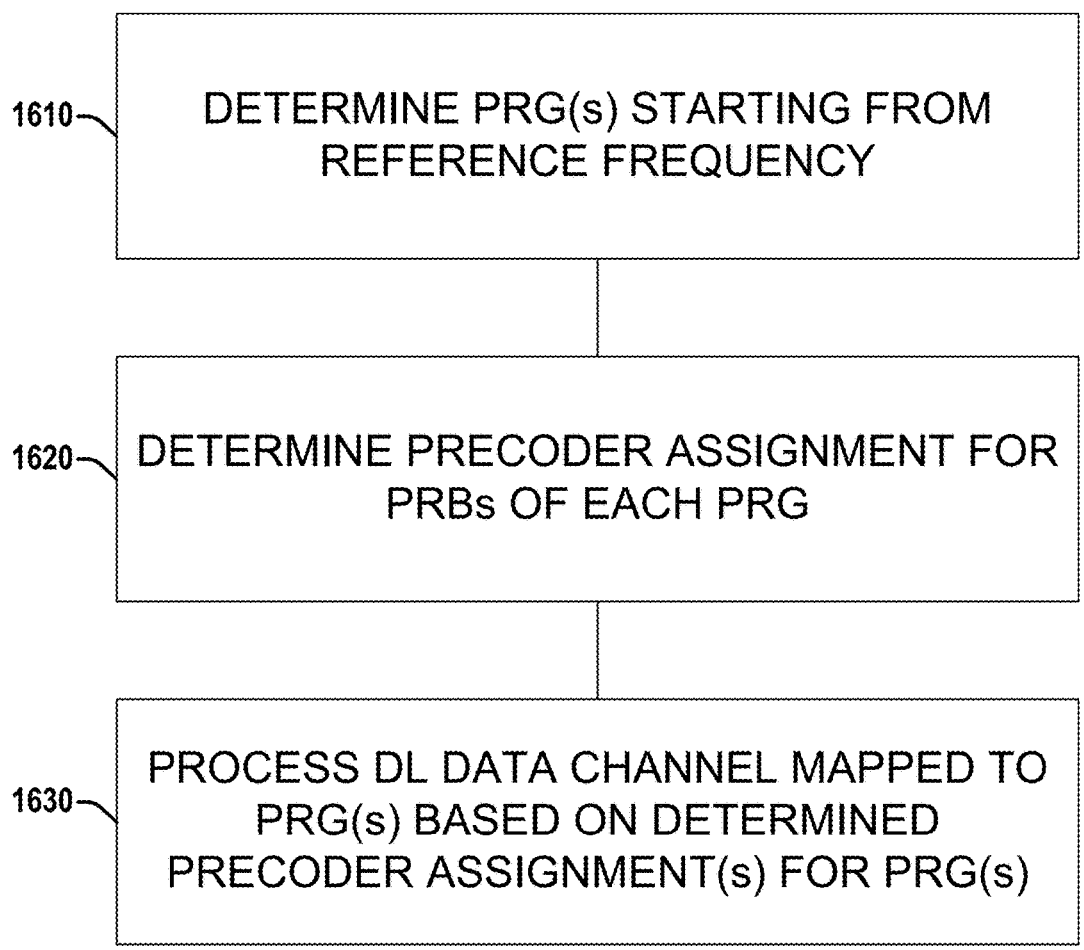
FIG. 16 is a flow diagram of an example method employable at a NR wireless communication device that facilitates precoder assignment for NR, according to various aspects discussed herein.

Referring to FIG. 16, illustrated is a flow diagram of an example method 1600 employable at a NR (New Radio) wireless communication device (e.g., gNB, UE, etc.) that facilitates precoder assignment for NR, according to various aspects discussed herein. In other aspects, a machine readable medium can store instructions associated with method 1600 that, when executed, can cause a NR wireless communication device to perform the acts of method 1600.

At 1610, one or more PRGs, each comprising two or more PRBs, can be determined, starting from a reference frequency (e.g., a center frequency of a SS block, etc.).

At 1620, a precoder assignment for each of the PRBs of the one or more PRGs can be determined, based on an assumed common precoder assignment for that PRG.

At 1630, a DL data channel can be transmitted (e.g., in gNB embodiments) or received (e.g., in UE embodiments) based on the determined precoder assignment(s).

Additionally or alternatively, method 1600 can include one or more other acts described herein in connection with various embodiments of system 400 or system 500 discussed herein in connection with the second set of aspects.

Figure 17:
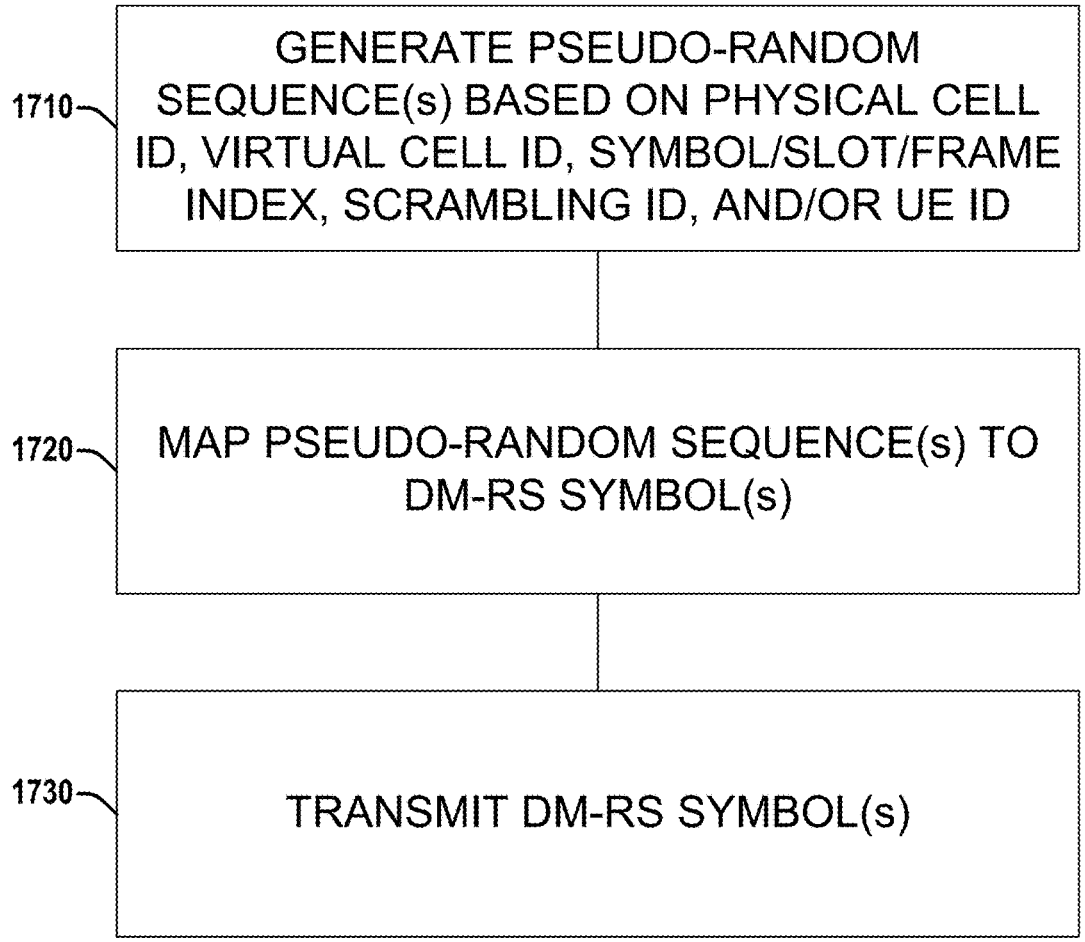
FIG. 17 is a flow diagram of an example method employable at a NR wireless communication device that facilitates DM-RS sequence generation for NR, according to various aspects discussed herein.

Referring to FIG. 17, illustrated is a flow diagram of an example method 1700 employable at a NR (New Radio) wireless communication device (e.g., gNB, UE, etc.) that facilitates DM-RS sequence generation for NR, according to various aspects discussed herein. In other aspects, a machine readable medium can store instructions associated with method 1700 that, when executed, can cause a NR wireless communication device to perform the acts of method 1700.

At 1710, one or more pseudo-random sequences can be generated based on one or more of a physical cell ID, a virtual cell ID, a symbol index, a slot index, a frame index, a scrambling ID, or a UE ID.

At 1720, the one or more pseudo-random sequences can be mapped to one or more DM-RS symbols.

At 1730, the one or more DM-RS symbols can be transmitted.

Additionally or alternatively, method 1700 can include one or more other acts described herein in connection with various embodiments of system 400 or system 500 discussed herein in connection with the third set of aspects.

A first example embodiment employable in connection with the first set of aspects discussed herein can comprise a method of reference signal modulation using a pseudo-noise (PN) sequence or apparatus (e.g., system 400 or system 500) configured to employ such a method, the method comprising: generating (e.g., by processor(s) 410 or processor(s) 510) one or more PN sequences in accordance with an initial state of a PN generator; extracting (e.g., via processor(s) 410 or processor(s) 510), for a resource block with the same global PRB index (set of subcarriers residing on the same physical frequencies), the same portion of an associated PN sequence of the one or more PN sequences, irrespective of the bandwidth part configuration at the UE or maximum number of PRBs supported by NR; and using (e.g., via processor(s) 410 or processor(s) 510) the extracted PN sequence for QPSK modulation and mapping to the reference signals REs within the PRB block(s) assigned to the UE.

In various aspects of the first example embodiment in connection with the first set of aspects, the reference signals are demodulation reference signals (DM-RS).

In various aspects of the first example embodiment in connection with the first set of aspects, the reference signals are channel state information reference signals (CSI-RS).

In various aspects of the first example embodiment in connection with the first set of aspects, the PN sequence comprises two PN sequence parts, a first PN sequence part generated (e.g., by processor(s) 410 or processor(s) 510) for the "positive" subcarrier indexes relative to a reference (e.g., central) subcarrier and a second PN sequence part generated (e.g., by processor(s) 410 or processor(s) 510) for the "negative" subcarrier indexes relative to the reference subcarrier. In various such aspects, the reference subcarrier can correspond to the central subcarrier index of the SS block, DC subcarrier or other subcarrier index indicated or configured by the gNB to the UE (e.g., via higher layer signaling generated by processor(s) 510, transmitted via communication circuitry 520, received via transceiver circuitry 420, and processed by processor(s) 410).

In various aspects of the first example embodiment in connection with the first set of aspects, the PN sequence(s) can be repeated every N PRBs. In various such aspects (or other aspects of the first example embodiment in connection with the first set of aspects), the UE can be configured (e.g., via higher layer signaling generated by processor(s) 510, transmitted via communication circuitry 520, received via transceiver circuitry 420, and processed by processor(s) 410) with a PRB block offset that can be used to extract (e.g., via processor(s) 410) the PN sequence for reference signal modulation. In various such aspects, the PN sequence can be repeated every reference bandwidth part. In various such aspects, the PN sequence generated (e.g., via processor(s) 410 or processor(s) 510) for the set of PRBs can be repeated every $N_{RB}^{max,DL}$ PRBs.

In various aspects of the first example embodiment in connection with the first set of aspects, the PN sequence is a Gold sequence of length 63.

In various aspects of the first example embodiment in connection with the first set of aspects, the PN sequence is a Gold sequence of length 127.

A first example embodiment employable in connection with the second set of aspects discussed herein can comprise a method of precoder assigment to physical resource blocks (PRBs) or apparatus configured to employ such a method, wherein the method comprises: determining (e.g., via processor(s) 410) a precoding group set comprising two or more consecutive PRBs, wherein the UE can assume (e.g., via processor(s) 410) the same precoder assignment for all PRBs of the precoding group set, wherein consecutive PRBs are assigned to precoding group sets starting from the center frequency; and receiving (e.g., via transceiver circuitry 420) a downlink data channel (e.g., generated by processor(s) 510, transmitted via communication circuitry 520, received via transceiver 420, and processed by processor(s) 410) in accordance with the precoder assignment via the scheduled PRB(s).

In various aspects of the first example embodiment of the second set of aspects, the center frequency corresponds to the center of the synchronization signal block (e.g., generated by processor(s) 510, transmitted via communication circuitry 520, received via transceiver 420, and processed by processor(s) 410).

A second example embodiment employable in connection with the second set of aspects discussed herein can comprise a method of precoder assignment to physical resource blocks (PRBs) or apparatus configured to employ such a method, the method comprising: determining (e.g., via processor(s) 410) a precoding group set comprising two or more consecutive PRBs, wherein the UE can assume (e.g., via processor(s) 410) the same precoder for all PRBs of the precoding group set, where consecutive PRBs are assigned from one of the center frequency, the lowest frequency or the highest frequency of the resource allocation; and receiving (e.g., via transceiver circuitry 420) a downlink data channel (e.g., generated by processor(s) 510, transmitted via communication circuitry 520, received via transceiver 420, and processed by processor(s) 410) via the scheduled PRB(s) in accordance with the precoder assignment.

In various aspects of the second example embodiment of the second set of aspects, the resource allocation can corresponds to the scheduled PRBs in a given slot.

In various aspects of the second example embodiment of the second set of aspects, the resource allocation comprises a configured bandwidth part.

In various aspects of either the first or the second example embodiment of the second set of aspects, when the number of PRBs is not an integer multiple of number of PRBs in the precoding group, the number of PRBs in a precoding group on the boundary of the bandwidth or allocated resources are reduced.

A first example embodiment employable in connection with the third set of aspects discussed herein can comprise a method of wireless communication for NR or apparatus configured to employ such a method, the method comprising: generating, by a NR wireless communication device (e.g., gNB, UE, etc.) (e.g., via processor(s) 410 or processor(s) 510), a pseudo-random sequence based at least in part on one or more of the following parameters: a physical cell ID, a virtual cell ID, a symbol index, a slot index, a frame index, a scrambling ID, or a UE ID; mapping, by a NR wireless communication device (e.g., gNB, UE, etc.) (e.g., via processor(s) 410 and transceiver circuitry 420 or processor(s) 510 and communication circuitry 520), the pseudo-random sequence into a DeModulation-Reference Signal (DM-RS) signal symbol; and transmitting, by a NR wireless communication device (e.g., gNB, UE, etc.) (e.g., via communication circuitry 520 or transceiver circuitry 420), the DM-RS symbol.

In various aspects of the first example embodiment of the third set of aspects, in scenarios wherein the same numerology is applied (e.g., by processor(s) 410 and processor(s) 510) for two or more bandwidth parts, a long pseudo-random sequence in accordance with the total bandwidth of the two or more bandwidth parts and numerology can be generated (e.g., by processor(s) 410 or processor(s) 510) for DM-RS.

In various aspects of the first example embodiment of the third set of aspects, in scenarios wherein the same or different numerologies can be applied for two or more bandwidth parts, an independent pseudo-random sequence in accordance with different bandwidth parts and associated numerologies can be generated (e.g., by processor(s) 410 or processor(s) 510) for DM-RS in each bandwidth part.

In various aspects of the first example embodiment of the third set of aspects, the pseudo-random sequence in each bandwidth part can be further defined as a function of bandwidth part index and/or a parameter associated with each bandwidth part.

In various aspects of the first example embodiment of the third set of aspects, the slot index can be defined in accordance with reference numerology. In various such aspects, a long sequence can be generated (e.g., by processor(s) 410 or processor(s) 510) within one slot and one bandwidth part in accordance with the reference numerology, wherein DM-RS sequence can be mapped (e.g., via processor(s) 410 and transceiver circuitry 420 or processor(s) 510 and communication circuitry 520) accordingly to each DM-RS symbol.

In various aspects of the first example embodiment of the third set of aspects, the symbol index can be included in the DM-RS sequence generation (e.g., by processor(s) 410 or processor(s) 510) in addition to the slot index.

In various aspects of the first example embodiment of the third set of aspects, the slot index can be defined in accordance with an associated numerology in each bandwidth part.

In various aspects of the first example embodiment of the third set of aspects, the scrambling sequence for the transmission of data and/or control channel(s) can be generated (e.g., by processor(s) 410 or processor(s) 510) as a function of the scrambling seed that can be defined as a function of one or more of the following parameters: a physical cell ID, a virtual cell ID, a frame index, a slot index, or a symbol index. In various such aspects, the slot index can be determined (e.g., by processor(s) 410 or processor(s) 510) in accordance with either the reference numerology or the numerology associated with each bandwidth part. In various such aspects, in scenarios wherein the slot index can be determined (e.g., by processor(s) 410 or processor(s) 510) based at least in part on the reference numerology, and in scenarios wherein symbol level based transmission (e.g., by transceiver circuitry 420 or communication circuitry 520) for the data and/or control channel(s) (e.g., generated by processor(s) 410 and processor(s) 510) is employed, a symbol index in accordance with the reference numerology can also be included in the scrambling sequence generation (e.g., by processor(s) 410 or processor(s) 510). In various such aspects, in scenarios involving mini-slot aggregation, the symbol index used for the scrambling sequence generation (e.g., by processor(s) 510) for the DL control and/or data channel(s) (e.g., generated by processor(s) 510) can be defined in accordance with the first symbol scheduled for the transmission (e.g., by communication circuitry 520). In various such scenarios, in scenarios involving slot aggregation when one transport block (TB) spans multiple slots, the slot index used for the scrambling sequence generation (e.g., by processor(s) 510) for the DL control or data channel (e.g., generated by processor(s) 510) can be defined in accordance with the first slot scheduled for the transmission.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a NR (New Radio) wireless communication device, comprising: a memory interface; and processing circuitry configured to: generate one or more PN (Pseudo Noise) sequences based at least in part on an initial state of a PN generator; extract, for each PRB (Physical Resource Block) of one or more PRBs, an associated portion of an associated PN sequence of the one or more PN sequences, based at least in part on a reference subcarrier index, independent of a bandwidth part configuration and of a maximum supported number of PRBs; generate, for each PRB of the one or more PRBs, an associated set of RS (Reference Signals) for that PRB based at least in part on the extracted associated portion of the associated PN sequence for that PRB; and send the one or more PN sequences to a memory via the memory interface, wherein the NR wireless communication device is one of a gNB (next generation Node B) or a UE (User Equipment).

Example 2 comprises the subject matter of any variation of any of example(s) 1, wherein, for each PRB of the one or more PRBs, the associated set of RS for that PRB comprises DM (Demodulation)-RS.

Example 3 comprises the subject matter of any variation of any of example(s) 1, wherein, for each PRB of the one or more PRBs, the associated set of RS for that PRB comprises CSI (Channel State Information)-RS.

Example 4 comprises the subject matter of any variation of any of example(s) 1-3, wherein the one or more PN sequences comprises a first PN sequence and a second PN sequence, wherein the first PN sequence is the associated PN sequence for each PRB of the one or more PRBs that comprises subcarriers with subcarrier indexes higher than the reference subcarrier index, and wherein the second PN sequence is the associated PN sequence for each PRB of the one or more PRBs that comprises subcarriers with subcarrier indexes lower than the reference subcarrier index.

Example 5 comprises the subject matter of any variation of any of example(s) 1-3, wherein the reference subcarrier index is associated with one of a central subcarrier of a SS (Synchronization Signal) block, a DC (Direct Current) subcarrier, or a subcarrier indicated via configuration signaling.

Example 6 comprises the subject matter of any variation of any of example(s) 1-3, wherein the one or more PN sequences comprises a single PN sequence that is the associated PN sequence for each PRB, and wherein the associated portion of the single PN sequence repeats every N PRBs, wherein N is a positive integer.

Example 7 comprises the subject matter of any variation of any of example(s) 6, wherein the one or more PRBs comprise two or more BW (Bandwidth) parts, and wherein each BW part of the two or more BW parts comprises N PRBs.

Example 8 comprises the subject matter of any variation of any of example(s) 6, wherein N is a maximum number of PRBs for a given BW (Bandwidth).

Example 9 comprises the subject matter of any variation of any of example(s) 1-3, wherein the processing circuitry is configured to extract, for each PRB of the one or more PRBs, the associated portion of the associated PN sequence based at least in part on a configured PRB offset.

Example 10 comprises the subject matter of any variation of any of example(s) 1-3, wherein each of the one or more PN sequences is a Gold sequence of length 63.

Example 11 comprises the subject matter of any variation of any of example(s) 1-3, wherein each of the one or more PN sequences is a Gold sequence of length 127.

Example 12 is an apparatus configured to be employed in a UE (User Equipment), comprising: a memory interface; and processing circuitry configured to: determine one or more PRGs (PRB (Physical Resource Block) Groups), wherein each PRG comprises two or more consecutive PRBs, starting from a reference frequency; determine, for each PRG of the one or more PRGs, an associated precoder assignment for that PRG, wherein the associated precoder assignment of that PRG is associated with each PRB of the two or more consecutive PRBs of that PRG; process a downlink data channel mapped to the one or more PRGs, based at least in part on the associated precoder assignment for each PRG of the one or more PRGs; and send, for each PRG of the one or more PRGs, an indicator of the associated precoder assignment for that PRG to a memory via the memory interface.

Example 13 comprises the subject matter of any variation of any of example(s) 12, wherein the reference frequency is a center frequency of a SS (Synchronization Signal) block.

Example 14 comprises the subject matter of any variation of any of example(s) 12, wherein the reference frequency is one of a center frequency of a resource allocation of the UE, a lowest frequency of the resource allocation, or a highest frequency of the resource allocation.

Example 15 comprises the subject matter of any variation of any of example(s) 14, wherein the resource allocation comprises all PRBs scheduled for the UE in a slot.

Example 16 comprises the subject matter of any variation of any of example(s) 14, wherein the resource allocation comprises a configured BW (Bandwidth) part for the UE.

Example 17 comprises the subject matter of any variation of any of example(s) 12-16, wherein the one or more PRGs is a plurality of PRGs comprising one or more boundary PRGs and one or more other PRGs, wherein the one or more other PRGs comprise N PRBs, where N is a positive integer, wherein the one or more boundary PRGs are located at one of an upper boundary of a resource allocation of the UE or a lower boundary of the resource allocation, wherein the resource allocation comprises M PRBs, wherein M is a positive integer greater than N, wherein the one or more boundary PRGs comprise N PRBs when M is an integer multiple of N, and wherein the one or more boundary PRGs comprise fewer than N PRBs when M is not an integer multiple of N.

Example 18 comprises the subject matter of any variation of any of example(s) 12-16, wherein the processing circuitry is further configured to determine the reference frequency based at least in part on a configured PRB offset.

Example 19 is an apparatus configured to be employed in a NR (New Radio) wireless communication device, comprising: a memory interface; and processing circuitry configured to: generate one or more pseudo-random sequences based at least in part on one or more of a physical cell ID (Identifier), a virtual cell ID, a symbol index, a slot index, a frame index, a scrambling ID, or a UE (User Equipment) ID; map the one or more pseudo-random sequences to at least one DM (Demodulation)-RS (Reference Signal) symbol; and send the one or more pseudo-random sequences to a memory via the memory interface, wherein the NR wireless communication device is one of a gNB (next generation Node B) or a UE.

Example 20 comprises the subject matter of any variation of any of example(s) 19, wherein the at least one DM-RS symbol is associated with two or more BW (Bandwidth) parts with a common numerology, and wherein the one or more pseudo-random sequences is a long pseudo-random sequence based at least in part on the common numerology and a total bandwidth of the two or more BW parts.

Example 21 comprises the subject matter of any variation of any of example(s) 19, wherein the at least one DM-RS symbol is associated with two or more BW (Bandwidth) parts comprising a first BW part and a second BW part, the first BW part having a first BW and a first numerology, the second BW part having a second BW part and a second numerology, wherein the first numerology is distinct from the second numerology, wherein the one or more pseudo-random sequences comprises a first pseudo-random sequence and a second pseudo-random sequence, wherein the first pseudo-random sequence is based at least in part on the first numerology and the first BW, and wherein the second pseudo-random sequence is based at least in part on the second numerology and the second BW.

Example 22 comprises the subject matter of any variation of any of example(s) 19, wherein the at least one DM-RS symbol is associated with one or more BW (Bandwidth) parts, wherein each BW part has an associated pseudo-random sequence of the one or more pseudo-random sequences that is mapped to that BW part, wherein for each BW part the associated pseudo-random sequence is based at least in part one or more of a BW part index of that BW part or a parameter associated with that BW part.

Example 23 comprises the subject matter of any variation of any of example(s) 19-22, wherein the processing circuitry is configured to generate the one or more pseudo-random sequences based at least in part on the slot index, wherein the slot index is defined based on a reference numerology.

Example 24 comprises the subject matter of any variation of any of example(s) 23, wherein the one or more pseudo-random sequences comprise a long pseudo-random sequence generated within a slot and a BW (Bandwidth) part based at least in part on the reference numerology, wherein the slot comprises the at least one DM-RS symbol, and wherein the processor is configured to map the long pseudo-random sequence to the at least one DM-RS symbol.

Example 25 comprises the subject matter of any variation of any of example(s) 19-22, wherein the processing circuitry is configured to generate the one or more pseudo-random sequences based at least in part on the symbol index and the slot index.

Example 26 comprises the subject matter of any variation of any of example(s) 19-22, wherein the processing circuitry is configured to generate the one or more pseudo-random sequences based at least in part on the slot index, wherein, for each pseudo-random sequence of the one or more pseudo-random sequences, the slot index is defined based on an associated numerology of a BW part associated with that pseudo-random sequence.

Example 27 comprises the subject matter of any variation of any of example(s) 19-22, wherein the processing circuitry is further configured to: generate a channel, wherein the channel is a NR data channel or a NR control channel; scramble the channel based on a scrambling sequence, wherein a scrambling seed of the scrambling sequence is based at least in part on one or more of the physical cell ID, the virtual cell ID, a second symbol index associated with the channel, a second slot index associated with the channel, or a second frame index associated with the channel; and map the channel to one or more symbols of one or more slots comprising the at least one DM-RS symbol.

Example 28 comprises the subject matter of any variation of any of example(s) 27, wherein the scrambling sequence is based at least in part on the second slot index, wherein the second slot index is based at least in part on one of a reference numerology or a numerology of a BW part associated with the channel.

Example 29 comprises the subject matter of any variation of any of example(s) 28, wherein the second slot index is based at least in part on the reference numerology, and wherein the scrambling sequence is based at least in part on the second symbol index.

Example 30 comprises the subject matter of any variation of any of example(s) 27, wherein the scrambling sequence is based at least in part on the second symbol index, and wherein a value of the second symbol index is based on a first symbol of the one or more symbols of the one or more slots.

Example 31 comprises the subject matter of any variation of any of example(s) 27, wherein the scrambling sequence is based at least in part on the second slot index, wherein the one or more slots is a plurality of slots, and wherein a value of the second slot index is based on a first slot of the plurality of slots.

Example 32 comprises an apparatus comprising means for executing any of the described operations of examples 1-31.

Example 33 comprises a machine readable medium that stores instructions for execution by a processor to perform any of the described operations of examples 1-31.

Example 34 comprises an apparatus comprising: a memory interface; and processing circuitry configured to: perform any of the described operations of examples 1-31.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor of a User Equipment (UE), configured to:
   determine one or more Precoding Resource block Groups (PRGs), wherein each PRG comprises one or more consecutive Physical Resource Blocks (PRBs), starting from a reference resource block;
   determine, for each PRG of the one or more PRGs, an associated precoder assignment for that PRG, wherein the associated precoder assignment for that PRG is associated with each PRB of the one or more consecutive PRBs of that PRG; and
   process a downlink data channel mapped to the one or more PRGs, based at least in part on the associated precoder assignment for each PRG of the one or more PRGs,
   wherein the one or more PRGs comprise a boundary PRG and one or more other PRGs, wherein the one or more other PRGs each comprise N PRBs, wherein N is a positive integer, wherein the boundary PRG is located at an upper boundary of a bandwidth part, wherein the bandwidth part comprises M PRBs, wherein M is a positive integer greater than N, wherein the boundary PRG comprises N PRBs when M is an integer multiple of N, and wherein the boundary PRG comprises fewer than N PRBs when M is not an integer multiple of N.

2. The baseband processor of claim 1, wherein the reference resource block is a center resource block of a synchronization signal (SS) block.

3. The baseband processor of claim 1, wherein the baseband processor is further configured to determine the reference resource block based at least in part on a configured offset.

4. The baseband processor of claim 1, wherein the reference resource block is determined based on a resource allocation of the UE.

5. The baseband processor of claim 4, wherein the reference resource block is a center resource block of the resource allocation of the UE.

6. The baseband processor of claim 4, wherein the reference resource block is a lowest resource block of the resource allocation of the UE.

7. The baseband processor of claim 4, wherein the reference resource block is a highest resource block of the resource allocation of the UE.

8. The baseband processor of claim 4, wherein the resource allocation comprises all PRBs scheduled for the UE in a slot.

9. The baseband processor of claim 4, wherein the resource allocation comprises a configured BW (Bandwidth) part for the UE.

10. The baseband processor of claim 1, wherein the reference resource block is a cell-specific reference resource block.

11. The baseband processor of claim 1, wherein the reference resource block is a UE-specific reference resource block.

12. A method for a user equipment (UE), comprising:
   determining one or more Precoding Resource block Groups (PRGs), wherein each PRG comprises one or more consecutive Physical Resource Blocks (PRBs), starting from a reference resource block;
   determining, for each PRG of the one or more PRGs, an associated precoder assignment for that PRG, wherein the associated precoder assignment for that PRG is associated with each PRB of the one or more consecutive PRBs of that PRG; and
   processing a downlink data channel mapped to the one or more PRGs, based at least in part on the associated precoder assignment for each PRG of the one or more PRGs,
   wherein the one or more PRGs comprise a boundary PRG and one or more other PRGs, wherein the one or more other PRGs each comprise N PRBs, wherein N is a positive integer, wherein the boundary PRG is located at an upper boundary of a bandwidth part, wherein the bandwidth part comprises M PRBs, wherein M is a positive integer greater than N, wherein the boundary PRG comprises N PRBs when M is an integer multiple of N, and wherein the boundary PRG comprises fewer than N PRBs when M is not an integer multiple of N.

13. The method of claim 12, wherein the reference resource block is a center resource block of a synchronization signal (SS)-block.

14. The method of claim 12, further comprising determining the reference resource block based at least in part on a configured offset.

15. The method of claim 12, wherein the reference resource block is determined based on a resource allocation of the UE.

16. The method of claim 15, wherein the reference resource block is a center resource block of the resource allocation of the UE.

17. The method of claim 15, wherein the reference resource block is a lowest resource block of the resource allocation of the UE.

18. The method of claim 15, wherein the reference resource block is a highest resource block of the resource allocation of the UE.

19. The method claim 15, wherein the resource allocation comprises all PRBs scheduled for the UE in a slot.

20. The method of claim 15, wherein the resource allocation comprises a configured bandwidth part for the UE.

21. The method of claim 12, wherein the reference resource block is a cell-specific reference resource block.

22. The method of claim 12, wherein the reference resource block is a UE-specific reference resource block.

* * * * *